(12) United States Patent
Wei et al.

(10) Patent No.: US 10,158,682 B2
(45) Date of Patent: *Dec. 18, 2018

(54) POWER EFFICIENT MULTIMEDIA CONTENT STREAMING BASED ON A SERVER PUSH

(71) Applicant: Adobe Systems Incorporated, San Jose, CA (US)

(72) Inventors: Sheng Wei, San Jose, CA (US); Viswanathan Swaminathan, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 325 days.

This patent is subject to a terminal disclaimer.

(21) Appl. No.: 14/863,247

(22) Filed: Sep. 23, 2015

(65) Prior Publication Data
US 2017/0085602 A1    Mar. 23, 2017

(51) Int. Cl.
*G06F 15/16* (2006.01)
*H04L 29/06* (2006.01)

(52) U.S. Cl.
CPC ...... *H04L 65/1089* (2013.01); *H04L 65/4015* (2013.01); *H04L 65/4061* (2013.01)

(58) Field of Classification Search
USPC ........ 709/219, 222, 220, 224, 236, 242, 202
See application file for complete search history.

(56) References Cited

U.S. PATENT DOCUMENTS

| | | |
|---|---|---|
| 2012/0179834 A1 | 7/2012 | Van Der Schaar |
| 2013/0017815 A1 | 1/2013 | Damola |
| 2013/0094364 A1 | 4/2013 | Björkengren et al. |
| 2013/0114597 A1* | 5/2013 | Ogisawa ............... H04L 12/185 370/390 |
| 2013/0246643 A1 | 9/2013 | Luby et al. |
| 2014/0282810 A1 | 9/2014 | Lohmar et al. |
| 2014/0344468 A1* | 11/2014 | Saremi ................. H04L 65/105 709/231 |
| 2016/0192296 A1 | 6/2016 | Rehan |
| 2016/0198012 A1 | 7/2016 | Fablet |
| 2016/0234282 A1* | 8/2016 | Lederer ................. H04L 65/608 |

(Continued)

OTHER PUBLICATIONS

U.S. Appl. No. 14/863,261, First Action Interview Office Action Summary, dated Sep. 15, 2017, 6 pages.

(Continued)

*Primary Examiner* — Lan Dai T Truong
(74) *Attorney, Agent, or Firm* — Kilpatrick Townsend & Stockton LLP

(57) ABSTRACT

Techniques for influencing power consumption of a client while streaming multimedia content from a server over a network are described. For example, a server push strategy is used to push a number of media segments of the multimedia content from the server to the client in response to a single request identifying one of the media segments. Thus, instead of using multiple requests, the media segments are provided to the client by using a single request. Reducing the number of requests influences (e.g., reduces) the power consumption of the client. To optimize the power consumption given current client, server, and/or network conditions, the number of the media segments to be pushed is computed based on parameters associated with these conditions.

20 Claims, 14 Drawing Sheets

(56) References Cited

U.S. PATENT DOCUMENTS

| | | | |
|---|---|---|---|
| 2016/0308934 A1* | 10/2016 | Gholmieh | H04L 67/02 |
| 2016/0309241 A1 | 10/2016 | Ljung | |
| 2016/0373789 A1* | 12/2016 | Tsukagoshi | H04N 21/235 |
| 2017/0085620 A1 | 3/2017 | Swaminathan et al. | |
| 2017/0180444 A1* | 6/2017 | Denoual | H04L 65/601 |
| 2018/0013845 A1 | 1/2018 | Denoual | |

OTHER PUBLICATIONS

Swaminathan, Viswanathan, "Are We in the Middle of a Video Streaming Revolution", ACM Trans, Multimedia Computing Communications Applications, vol. 9, No. 1s, Article 40, Oct. 2013, 6 pages.

Michalos, M.G., "Dynamic Adaptive Streaming Over HTTP", Journal of Engineering Science and Technology Review, vol. 5, No. 2, 2012, 5 pages.

Universal Mobile Telecommunications System, Radio Resource Control, 3rd Generation Partnership Project (3GPP), Protocol Specification, Tech Spec, 25.31, Dec. 2006, 1,318 pages.

Li, Xin, et al., "GreenTube: Power Optimization for Mobile Video Streaming via Dynamic Cache Management", Proceedings of 20th ACM International Conference on Multimedia, Oct.-Nov. 2012, 10 pages.

Tian, Guibin, "On Adaptive HTTP Streaming to Mobile Devices", IEEE Xplore, Packet Video Workshop, Dec. 2013, 8 pages.

Belshe, M., et al., Hypertext Transfer Protocol Version 2 (HTTP/2), RFC7540, May 2015.

Huang, Junxian, et al., "A Close Examination of Performance and Power Characteristics of 4G LTE Networks," Proceedings of 10th ACM International Conference on Multimedia, 2012, 14 pages.

Nazir, Sajid, et al., "Performance Evaluation of Congestion Window Validation for Dash Transport", Nossdav Proceedings of Network and Operating System Support on Digital Audio and Video Workshop, 2014, 6 pages.

Wei, Sheng, et al., "Low Latency Live Video, Streaming Over HTTP 2.0", Nossdav Proceedings of Network and Operating System Support on Digital Audio and Video Workshop, 2014, 6 pages.

Wei, S., et al., Cost Effective Video Streaming Using Server Push over HTTP 2.0, IEEE MMSP, 2014, 6 pages.

Wei, Sheng, et al., "Power Efficient Mobile Video Streaming Using HTTP/2 Server Push", Nossdav Proceedings of 25th ACM Workshop on Network and Operating System Support for Digital Audio and Video, 2015, 6 pages.

4G LTE Speeds vs. Your Home Network, available online: http://www.verizonwireless.com/insiders-guide/network-andplans/4g-lte-speeds-compared-to-home-network/, accessed Oct. 5, 2015, 10 pages.

Gerber, A. et al., "A Call for More Energy-Efficient Apps", available online: http://www.research.att.com, accessed Oct. 5, 2015, 7 pages.

Monsoon Power Monitor, available online: http://www.msoon.com/LabEquipment/PowerMonitor/, accessed Oct. 5, 2015, 1 page.

Souders, Steve, Making a mobile connection, available online: http://www.stevesouders.com/blog/2011/09/21/making-a-mobileconnection/, accessed Oct. 5, 2015, 4 pages.

dash.js, DASH Industry Forum, available online: https://github.com/Dash-Industry-Forum/dash.js, Oct. 5, 2015.

Dash Sequences, available online: http://gpac.wp.mines-telecom.fr/2012/02/23/dash-sequences/, accessed Oct. 5, 2015.

Final Office Action from related U.S. Appl. No. 14/863,261 dated Feb. 27, 2018, 22 pages.

U.S. Appl. No. 14/863,261, First Action Interview Pilot Program Pre-Interview Communication dated Jun. 26, 2017, 4 pages.

* cited by examiner

POWER EFFICIENT MULTIMEDIA CONTENT STREAMING BASED ON A SERVER PUSH

TECHNICAL FIELD

This disclosure relates generally to techniques for streaming multimedia content and, more specifically, to power efficient streaming in a client-server architecture.

BACKGROUND

In media streaming, multimedia content (e.g., video content) is presented to a user on a client device while portions of the content are being delivered, as distinguished from receiving the entire multimedia content before playback. The hypertext transfer protocol (HTTP) has been widely adopted as the application protocol for media streaming over the Internet because of its ease of deployment with existing web servers and scalability with the web caches. In HTTP streaming, multimedia content is divided into at least one sequence of media segments, with each media segment typically being regarded as a separate resource for HTTP requests and responses. The media segments are individually addressable by unique uniform resource locators (URLs) and are delivered individually using the stateless request-response protocol. HTTP streaming enables a client to stream the multimedia content by submitting, to the server, multiple requests corresponding to the multiple media segments.

With the rapid growth and popularity of smart phones and tablets, media streaming on mobile devices using HTTP over wireless networks, such as cellular networks (e.g., 3G and 4G/LTE), have become a trend. Unlike more traditional media streaming platforms such as desktop devices, mobile devices are greatly power constrained. For example, most smart phones need nightly charging, making the battery power an extremely constrained resource. However, in a media streaming scenario, a large amount of data is typically transmitted to the mobile device via a wireless radio interface, which consumes a large amount of battery power. The power consumption is further exacerbated by resource management protocols of the wireless networks. Generally, the resource management protocols dictate power levels to the mobile device even when no media segments are being transmitted. Because the mobile device streams multimedia content in HTTP by individually requesting the different media segments and because the resource management protocol of the wireless network dictates the power level to the mobile device for each request, HTTP streaming over a wireless network to the mobile device results in power inefficiencies.

SUMMARY

One exemplary embodiment involves influencing (e.g., reducing) power consumption of a client streaming multimedia content from a server in a wireless network environment. The streaming involves the client requesting media segments of the multimedia content and the server responding with the media segments. The request and response uses a communications protocol, such as using hypertext transfer protocol (HTTP). The exemplary embodiment involves determining a number greater than one of media segments to be requested from the server based on a context of one or more of: the client, the server, or the wireless network environment. The exemplary embodiment also involves using a single request, such as a single HTTP request, based on the determined number of the media segments. In response to the single request, the exemplary embodiment involves providing, such as pushing, the number of media segments from the server to the client. Because multiple media segments are received in response to a single request, the overall number of requests used by the client to stream the multimedia content is reduced. This reduction in the number of requests also reduces the power consumption. In addition, by using the context to determine the number of media segments to be pushed in response to a single request, current streaming conditions are accordingly considered which, in turn, enables adaptive streaming. The pushing process is repeated to push the total number of segments which, in turn, can enable timely bitrate switching and/or reducing bandwidth waste.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
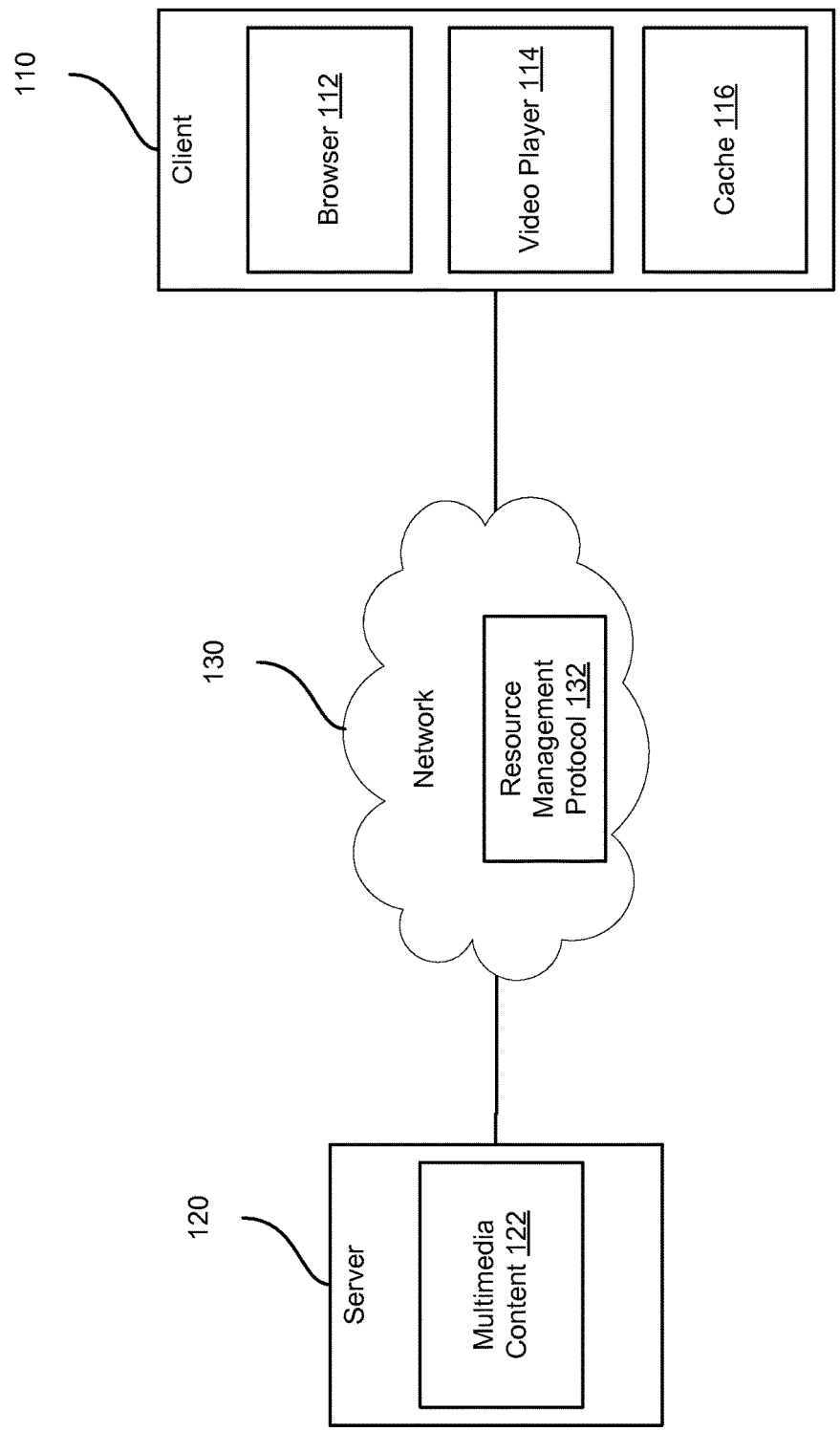
FIG. 1 illustrates an example system for streaming multimedia content, according to certain embodiments of the present disclosure.

Specific details of various exemplary embodiments of the present disclosure are set forth in the following description and are illustrated in FIGS. 1-14. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present disclosure.

Generally, the embodiments described herein are directed to, among other things, streaming multimedia content. Specifically, disclosed are methods, systems, and computer readable media that embody techniques for streaming multimedia content from a server to a client over wireless networks using a stateless communications protocol such as HTTP, where the streaming optimizes (e.g., reduces) the power consumption of the client.

As explained herein above, clients such as mobile device are power constrained. In addition, wireless networks typically include resource management protocols to manage power levels (and other resources) of mobile devices requesting data, such as media streams, over the wireless networks. For example, the radio resource control (RRC) protocol is widely used in 3G and 4G/LTE cellular networks. The RRC protocol specifies that the radio power of a mobile device would remain in the full power or half power mode after a data transmission has been completed, until inactivity timers expire. This power level setup can be referred to as the "long tail" feature. The "long tail" feature represents a period of time during which the mobile device is not in an idle state (e.g., the state in which the radio power consumption is close to zero) even when no data transmission is occurring. As such, the "long tail" feature involves some power inefficiencies. However, the power inefficiencies are balanced against performance. In particular, the intent of the RRC protocol is to save the initialization delay and thus ensure premium network performance (e.g., faster download speed), especially when consecutive network accesses are made within a short period of time. Other resource management protocols of wireless networks also tradeoff between power inefficiencies with performance.

In the context of mobile media streaming using HTTP, the "long tail" feature leads to significant power inefficiencies. For example, a mobile device may not enter an idle state (e.g., the state in which the radio power consumption is close to zero) because of the power level settings and timers dictated by the resource management protocols. Since the different resource management protocols, such as the RRC protocol, have already been widely deployed in existing wireless networks, and have been fully designed and optimized for various use cases of the wireless networks it is not realistic to change such protocols just for mobile device media streaming use cases.

Embodiments described herein relate to power efficient media streaming mechanisms. Two such mechanisms are described: a first mechanism referred to as "a power aware K-push mechanism" and a second mechanism referred to as "a power aware segment duration mechanism." Both mechanisms can be implemented separately or in conjunction. In addition, both mechanisms work in conjunction with and do not change the existing resource management protocols of the wireless networks. Both mechanisms influence (e.g., optimize or reduce) the power consumption by reducing the number of requests (e.g., HTTP requests) of the client (e.g., mobile device) to stream media.

In particular, the power aware K-push mechanism introduces a request technique to the communications protocol (e.g. HTTP) used by a mobile device for media streaming. The request technique involves the mobile device requesting multiple media segments (e.g., an integer number "K" of media segments) in a single request rather than in multiple requests as traditionally done. In response to the single request, the server pushes the multiple media segments (e.g., the "K" media segments) to the mobile device for storage thereat. The process of requesting "K" media segments is repeated in multiple request cycles to receive all of the media segments, where the number "K" can change in each request cycle. The mobile device then accesses and uses the different media segments from the storage.

Experiments show significant battery power savings based on the server and mobile device settings using the described mechanism. Because the mobile device follows a single, rather than multiple, "long tail" period of time in each request cycle, the mobile device more likely enters and remains in the idle state as the inactivity timers are less likely to expire multiple times (as in the case with multiple "long tail" periods of time). In particular, the media segments are downloaded faster than real time and, accordingly, the number of timer expiry is reduced. In the idle state, the radio power consumption is minimized, which results in the power savings.

Furthermore, the number "K" of media segments requested in a single request (e.g., within one request cycle) is dynamically computed based on the current conditions of the mobile device, the wireless network, and the server. While a too large number "K" (e.g., equal to the total number of media segments) results in the most power savings, the large number would hinder adaptive streaming. Thus, the computation based on the current conditions advantageously enables the adaptive balancing of power consumption and performance (e.g., adaptive streaming). A current condition represents a current context. A current context of a device, network, or server represents a collection of one or more parameters that influence a capability, feature, and/or performance of the device, network, or server. For example, the current contexts of the mobile device, the wireless network, and the server include battery power level of the mobile device, the desired bitrate of the media stream from the server to the mobile device, the available network bandwidth, inactivity timers of the resource management protocol, the available media segment durations, and/or other influencing parameters. Such parameters are used to compute the number of media segments.

The power aware K-push mechanism does not necessarily necessitate changes to the server, but needs computation of the "K" value and the use of a server push. In comparison, the power aware segment duration mechanism need not (but can) use a server push. Instead, any server transmission techniques (e.g., push and/or pull) is usable. Further, when a server push is not used, the "K" value need not be computed. However, the power aware segment duration mechanism may necessitate that the server pre-packages and stores overlapping media segments of different durations.

Similarly to the power aware K-push mechanism, the power aware segment duration achieves power efficiency by reducing the number of requests from the client (e.g., the mobile device) to the server. Under this second mechanism, the server stores multimedia content as multiple sets of equivalent content. Each set is composed of media segments. Media segments across different sets have different durations. For example, a one minute video may be stored as two sets of files. A first set is composed of twenty video segments, each three second long. A second set is composed of thirty video segments, each two second long.

Based on the current conditions of the mobile device, the wireless network, and the server, a particular segment duration is selected. Media segments of that duration are then transmitted to the mobile device. Obviously, the longer the particular segment duration is, the lower the number of requests for media segments is and, thus, the larger the power saving is. However, too long media segments can hinder how adaptive the media streaming is to the current conditions. Accordingly, the power aware segment duration mechanism selects the duration by balancing between the different parameters representative of the current conditions. These parameters include, for example, the battery power level of the mobile device, the desired bitrate of the media stream, the available network bandwidth, inactivity timers of the resource management protocol, and/or other condition-based parameters.

In the interest of clarity of explanation, the various embodiments are described in connection with power-constrained clients, such as mobile devices, video and audio streaming, HTTP, and cellular networks. However, the embodiments are not limited as such. Instead, the embodiments similarly apply to any type of a client including, for example, desktop computers regardless of the power constraints. Likewise, the streaming is not limited to video or audio, but includes other types of multimedia content such as text, graphics, or other types of multimedia content. Although HTTP is widely used, the embodiments similarly apply to other communications protocols. In addition, the embodiments apply to other types of wireless networks, such as Wi-Fi, and wired networks regardless of the utilized resource management protocols. Certainly, significant power efficiency results from implementing the embodiments in connection with power-constrained clients, video/audio streaming, HTTP, and cellular networks. Nonetheless, power efficiencies are also advantageously gained by implementing the embodiments in connection with any client, multimedia content, communication protocol, or network type.

Turning to FIG. 1, the figure illustrates an example computing system for streaming multimedia content, such as video content, from a server 120 to a client 110 over a network 130. The example computing system represents a media streaming solution that uses, for example HTTP. It should be understood that any number of servers and clients can be utilized within the scope of the present disclosure. Each can include a single device or multiple devices in a distributed environment. An example media streaming solution suitable to implement portions or all of the components of the illustrated computing system is Adobe® Primetime.

In an example, the server 120 represents a web server capable of streaming multimedia content, such as multimedia content 122, to clients. The server 120 can be a part of a content distribution network (CDN) for providing multimedia content to the clients. An example of the multimedia content 122 is further illustrated in FIG. 2. In addition, the server 120 is configured to use different approaches for streaming the multimedia content using a communications protocol, such as HTTP. In a typical traditional approach, the server 120 transmits only one requested media segment of the multimedia content 122 in response to an HTTP request identifying that media segment. In another approach, the server 120 uses a push strategy. Under this approach, the server pushes multiple media segments in response to an HTTP request identifying one media segment. An example of this approach includes the K-push strategy. In particular, the server pushes "K" media segments ("K" being an integer greater than "1").

As used herein, a "push" represents a network communication initiated by a server without requiring corresponding requests from a client. For example, a media segment is pushed by the server 120 to the client 110 without the client 110 specifically requesting the media segment in an HTTP request.

In an example, the client 110 represents a computing device capable of accessing the network 130 and streaming the multimedia content 122 from the server 120. The client device 110 can take a variety of forms, some of which are power-constrained. For instance, the client 110 can be any of a mobile device including a smart phone, a tablet, a laptop, a wearable computer, a personal digital assistant, a music player, a video player, a multimedia recorder, a global positioning system (GPS) device, or other battery-operated communication devices. Nonetheless, the client 110 need not be power constrained and can be any of a personal computer, a work station, or a server.

Figure 3:
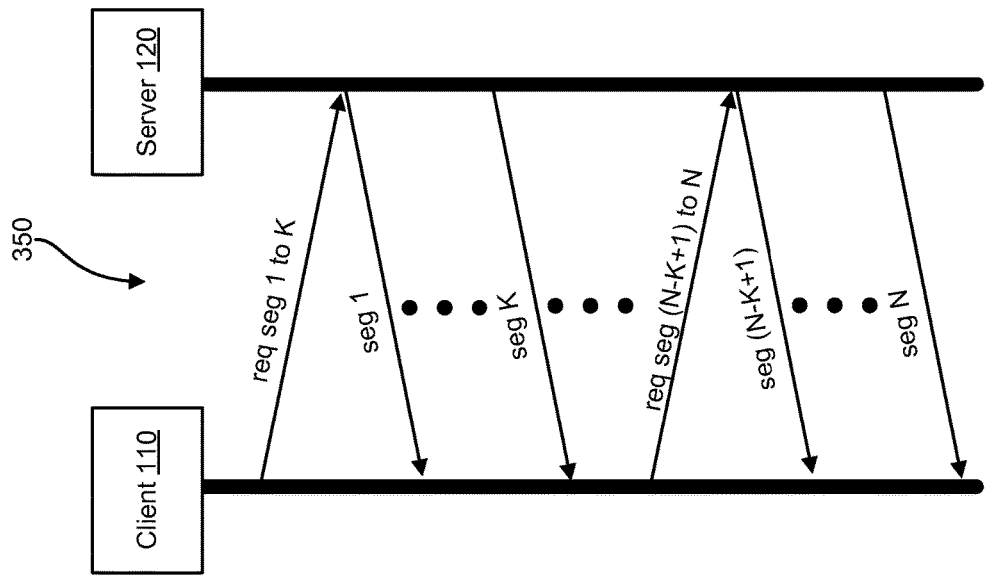
FIG. 3 illustrates example approaches for streaming multimedia content, according to certain embodiments of the present disclosure.
Figure 3:
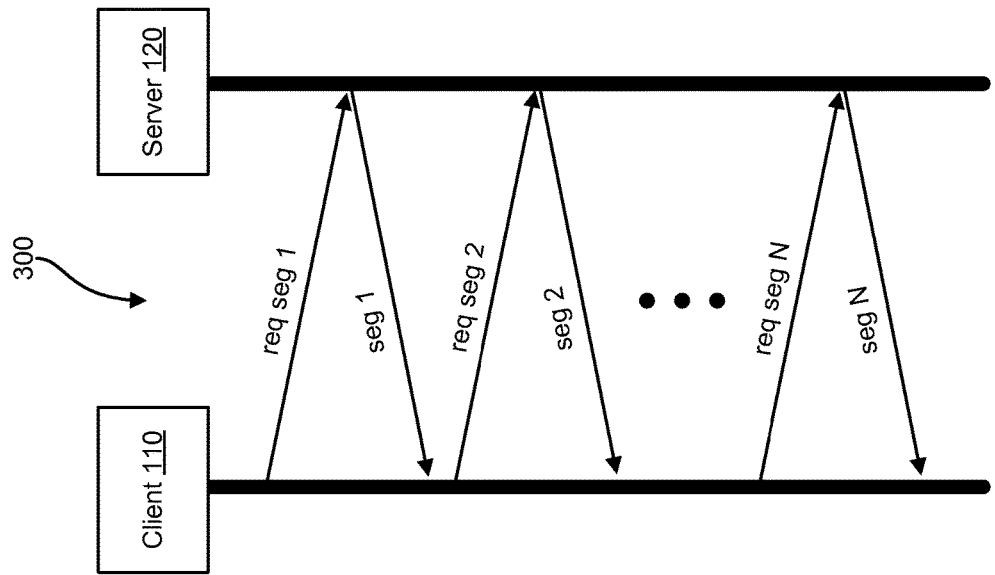

The client device 110 includes at least one application to stream and play the multimedia content 122. The application is configured to use the above different streaming approaches. In one example, the application requests each media segment individually from the server and accordingly plays the individually received media segments. In another example, the application takes advantage of the server push strategy. In this example, the application requests a single media segment and provides information to the server 120 about the number "K" of media segments. In response, the client 110 receives and locally stores the "K" media segments. The application then accesses the storage to play the "K" media segments without submitting additional requests (e.g., "K–1" requests) to the server 120. FIG. 3 illustrates these two client-server media streaming approaches.

An example of the application of the client device 110 includes a video player 114, such as a dynamic adaptive streaming over HTTP (DASH) player. The video player 114 is optionally integrated into a browser 112, interfaces with the browser 112, or is a standalone application separate from the browser 112. The browser represents an application that is implemented on the client 110 and that supports the HTTP protocol for accessing content from a remote source over the network 130. Where the video player 114 is integrated into the browser 112, the video player 112 represents a web application running on the browser 112, which could utilize the network stack of the browser 112 for communication with the server 120.

An example of the local storage of the client 110 accessible to the video player 114 includes a cache 116. For instance, the cache 116 represents a cache of the browser 112 and/or the video player 114 and stores multimedia content such as media segments of the multimedia content 122 received from the server 120. The video player 114 accesses the media segments stored in the cache 116 for playback.

In an example, the network 140 represents a wireless network, a wired network, or both types of networks. For instance, the network 140 includes multiple networks such as portions of the Internet or an Intranet. By way of example, the network 140 can include one or more wide area network (WANs), one or more local area networks (LANs), one or more public networks, such as the Internet, and/or one or more private networks, such as an Intranet. These various networks support different technologies, such as cellular and WiFi-related technologies. Where the network 130 includes a wireless telecommunications network, such as cellular and/or WiFi, components such as a base station, a communication tower, an access point, a router, as well as other network-related components, are part of the network 130 and provide wireless connectivity.

Figure 4:
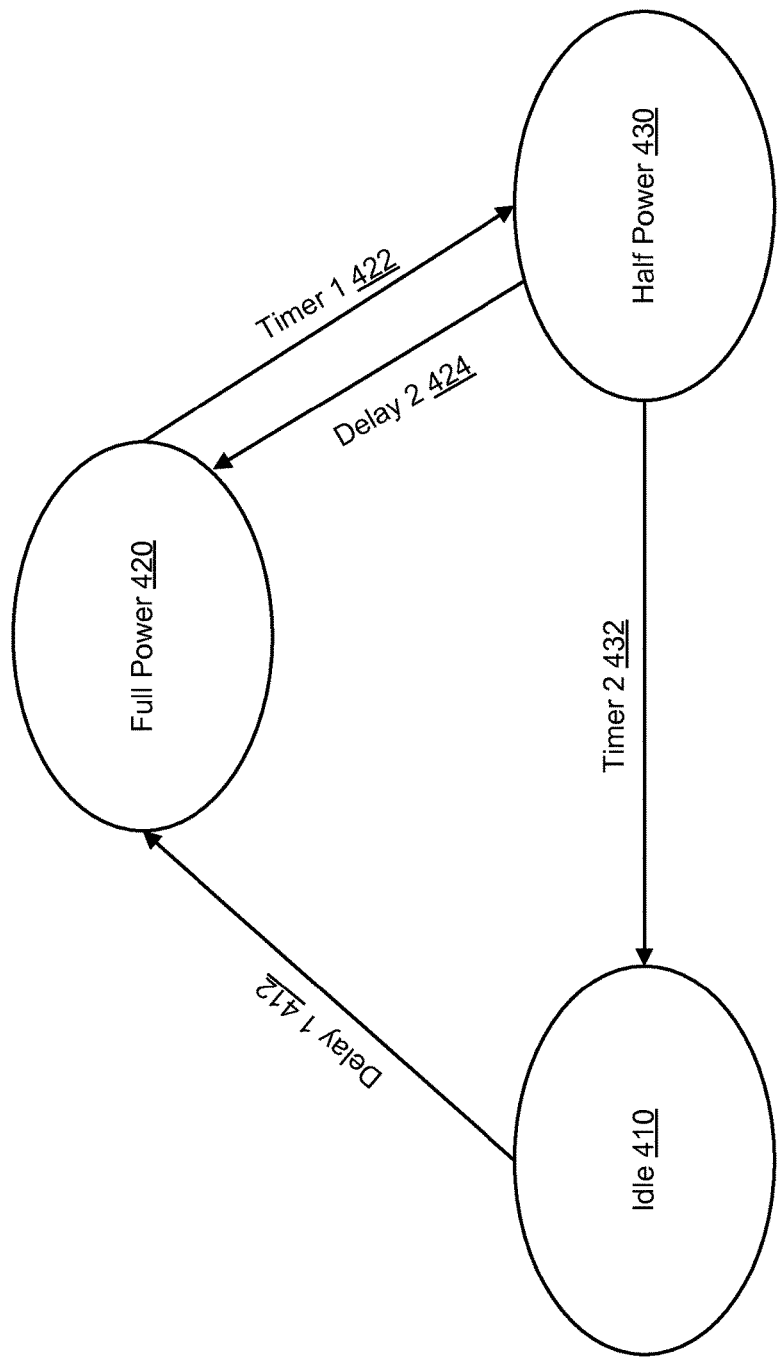
FIG. 4 illustrates an example state machine of a resource management protocol dictating power levels of a client, according to certain embodiments of the present disclosure.

As illustrated, the network 130 implements a resource management protocol 132. An example of this protocol 132 includes RRC for 3G/4G LTE cellular networks. Generally, the resource management protocol 132 is configured to manage different resources of the network 130, the client 110, and the server 120. For example, the resource management protocol 132 can dictate power levels that the client 110 needs to follow to request and receive media segments from the server 120. An example state machine that the management protocol 132 uses to manage the power levels is illustrated in FIG. 4.

The system illustrated in FIG. 1 enables the client 110 to stream the multimedia content from the server 120 over the network 130 in a power efficient manner without changing the resource management protocol 132. In an example of using the power aware K-push mechanism, in response to an HTTP request of the client 110 identifying a media segment, the server pushes "K" media segments to the client 110. The client receives and stores the "K" media segments in the cache 116. The request and push cycle can be repeated over multiple cycles. The video player 114 accesses the "K" media segments from the cache 116 for playback without submitting additional HTTP requests to the server 120. By avoiding the additional HTTP requests, the power management of the resource management protocol 132 more likely instructs the client 110 to enter an idle power state. Thus, the client 110 more likely enters such a state in which its power consumption associated with receiving media segments from the server 120 is reduced.

In an example of using the power aware segment duration mechanism, in response to an HTTP request of the client 110 identifying a media segment, the server transmits one or more media segments (e.g., via a K-push or via a pull) of particular durations. That duration is selected based on the current conditions of the client 110, the server 120, and the network 130 such that the total number of HTTP requests of the client 110 is reduced (e.g., because of longer media segment durations) while also balancing other streaming constraints (e.g., a desired bitrate given a network bandwidth). Reducing the number of HTTP requests in turn increases the likelihood of the client 110 more quickly entering and remaining in an idle state. This likelihood increase translates in improvement to the power consumption (e.g., additional efficiency).

Figure 2:
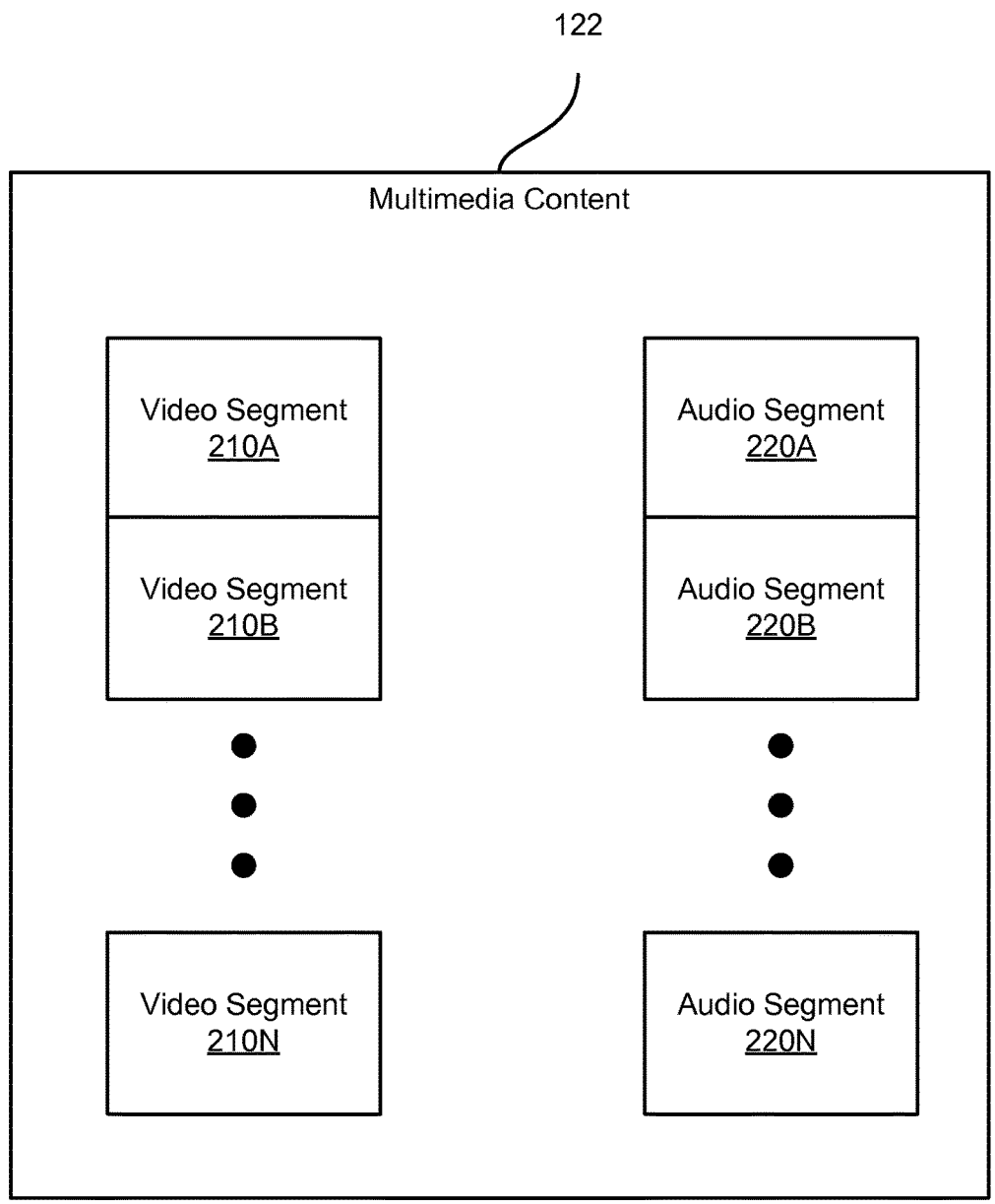
FIG. 2 illustrates an example multimedia content, according to certain embodiments of the present disclosure.

Turning to FIG. 2, the figure illustrates example media segments of the multimedia content 122. As illustrated, the multimedia content 122 includes a plurality of sub-streams. A sub-stream generally refers to a sequence of multimedia content. Each sub-stream typically spans an entirety of corresponding multimedia content. Further, each sub-stream is divided into a sequence of media segments, which can be played back in order by a media player on a client (e.g., the video player 116). Each media segment corresponds to a substantially fixed time period of the multimedia content 122. Examples of suitable time periods are in the range of one to ten seconds.

FIG. 2 illustrates two example sub-streams: a video sub-stream and an audio sub-stream. However, the multimedia content 122 is not limited as such and can include a larger and/or other types of sub-streams. For example, there may be multiple video sub-streams of the same multimedia content but with different durations for the respective video segments. Generally, a video sub-stream is composed of video segments 210A-N. Likewise, an audio sub-stream is composed of audio segments 220A-N. Each of the sub-streams and/or media segments can be identified, addressed, referenced, or handled in any networked information system such as by using uniform resource locators (URLs).

In an example, the client 110 identifies a media segment (e.g., the video segment 210A) in an HTTP request to the server 120 based on, for instance, the URL of the media segment. In response, the server transmits this media segment to the client 110. Further, in a server push, the server 120 also transmits additional media segments. These media segments can be of the same type (e.g., any of the video segments 210B-N) and/or of another type (e.g., any of the audio segments 220A-N). As such, in a push approach, the client 110 not only receives the requested video segment, but also automatically receives other video segments and/or audio segments without having to specifically request such additional segments from the server 120.

Different communications protocols are available for streaming the multimedia content 122 to the client 110. As described herein above, HTTP is an example of such protocols and is widely used. FIG. 3 illustrates different approaches for using HTTP streaming.

In a typical traditional approach 300, the client 110 individually requests and receives media segments from the server 120. If the client device is streaming a video sub-stream of "N" video segments, the client 110 submits "N" requests. This number "N" of requests may be associated with a large overhead which in conjunction with a resource management protocol (e.g., RRC), may lead to inefficient power consumption.

In comparison, by using a push approach, such as the K-push strategy 350, the client 110 submits a lower number of requests. In particular, in response to each request, the client 110 receives "K" media segments. Thus, for a substream of "N" video segments, the client 110 needs to only handle "N/K" requests. This reduction in the number of requests by a "K" factor leads to a reduction in power consumption (e.g., the number of timer expiry is reduced because the media segments are downloaded faster than real time, which results in the client 110 more likely entering and remaining in the idle state). Thus, the power efficiency associated with streaming the multimedia content 122 is improved. The process by which "K" is computed to optimize the power consumption is further illustrated in the next figures.

Generally, HTTP streaming is a scalable and easy-to-deploy video (and other media type) streaming solution over the Internet, which leverages the existing web servers and content distribution networks (CDNs). In HTTP streaming, multimedia content is divided into multiple small segments and deployed on the server 120 for the client 110 to request via HTTP (as illustrated in FIGS. 1 and 2). As shown in FIG. 3, under the traditional HTTP streaming approach 300, the client 110 requests media segments periodically from the server 120 for media playback. The client 110 maintains a buffer and requests a media segment whenever the content in the buffer falls below a certain threshold. At steady state, the client 110 would consume one media segment in the buffer within one media segment duration, which requires that the client 110 issues HTTP requests at the interval of a segment duration for a smooth media playback.

HTTP 2.0 is a new revision to the currently used HTTP protocol. HTTP 2.0 intends to enable a faster Internet by introducing a variety of new features, such as server push and stream multiplexing. Among all of the new features, server push enables a server-to-client communication channel unlike the traditional client-pull only mechanism. The server push feature enables the server to actively push HTTP resources to the client without requiring explicit requests. Although the server push technology was originally designed for reducing web page loading latency, it provides an elegant way of changing the HTTP request schedule in media streaming without compromising the scalability of HTTP streaming or making changes to the HTTP resources.

In particular, a K-push strategy is implementable on top of HTTP 2.0 or greater to take advantage of the server push. The K-push strategy 350 illustrates that in response to a single HTTP request for a media segment, the server 120 pushes "K" media segments. The pushed segments include the requested media segments and other unrequested media segments. An example for pushing "K" media segments is further described in U.S. patent application Ser. No. 14/581,916, filed on Dec. 23, 2014, entitled "Reducing Requests for Media Segments in Streaming of Multimedia Content," of the same inventors and applicant and which is incorporated herein by reference in its entirety. A further example for pushing "K" media segments is further described in U.S. patent application Ser. No. 14/213,127, filed on Mar. 14, 2014, entitled "Low Latency Live Video Streaming," of the same inventors and applicant and which is incorporated herein by reference in its entirety.

Generally and in some respects, the K-push strategy 350 can be seen as an extension to the push strategy. In the K-push strategy 340, the "K" value defines how many segments are pushed in response to a single HTTP request. Using the K-push strategy 350, in addition to sending a requested media segment, the server 120 also pushes "K−1" media segments to the client 110. In an example and in response to an HTTP request for a particular video segment, the "K−1" media segments can also be video segments, such as temporally concurrent video segments of the video sub-stream. The "K−1" media segments can also include other types of media segments, such as audio segments corresponding to the pushed video segments, and at least one temporally concurrent.

As such, the "K" value represents the number of media segments that should be pushed in response to a single HTTP request. According to embodiments of the present disclosure, the "K" value is used to optimize (e.g., reduce) the power consumption of the client 110 based on current conditions of the client 110, the server 120, and/or the network 130. This "K" value can be computed by the client 110 or by the server 120 based on parameters of these conditions including, for example, the battery power level of the client 110, a bitrate of streaming the video sub-stream, a bandwidth of the network 130, inactivity timers of a resource management protocol (e.g., the resource management protocol 132, as further illustrated in FIG. 4), and the duration of the video segments.

As described above, the inactivity timers are parameters considered when computing the "K" value. To better understand these parameters, FIG. 4 illustrates an example of how the inactivity timers are used by the resource management protocol. In particular, FIG. 4 illustrates an example state machine of the resource management protocol. The state machine is used to dictate power levels to the client 110. As a part of this dictation, the state machine uses the inactivity timers.

Various resource management protocols are available. In cellular networks, the RRC protocol is widely used and defines a state machine for the radio activity. FIG. 4 illustrates an example of this state machine for 3G cellular networks. Nonetheless, other resource management protocols for other networks generally define similar state machines.

As illustrated in FIG. 4, in the RRC idle mode 410, the power consumption is close to zero. Once data communication is initiated, the client 110 switches to a full power state 420 (e.g., Dedicated Channel, or DCH) after a certain delay (shown as "delay 1" 412 in FIG. 4), namely promotion delay. Then, data can be transmitted via the radio link. Once the data transmission is completed, the radio interface would stay at the full power state 420 until an inactivity timer (shown as "timer 1" 422 in FIG. 4) expires, during which time, the client 110 still consumes full power. After the state transitions to the half power state 430 (i.e., Forward Access Channel, or FACH), the power consumption reduces to approximately half of the full power state 420. While at the half power state 430, the client 110 may either switch back to the full power state 420, after another promotion delay (shown as "delay 2" 424 in FIG. 4) if there is data transmission, or switch to the idle state 410 after another inactivity timer (shown as "time 2" 432 in FIG. 4) expires.

In another example, in 4G/LTE, there is an improved RRC protocol with discontinuous reception (DRX) modes, which involves more sophisticated RRC state transitions and inactivity timers. Although there are three inactivity timers involved, there is only one timer (e.g., a tail timer) that is significant in terms of time and power consumption. Further, the power consumption in the tail period is not necessarily half of the full power mode. As such, for 4G/LTE (and other technologies), the state machine of FIG. 4 is usable by adjusting the timer values and power consumption levels at the different states according to the specifics of the technology.

Figure 5:
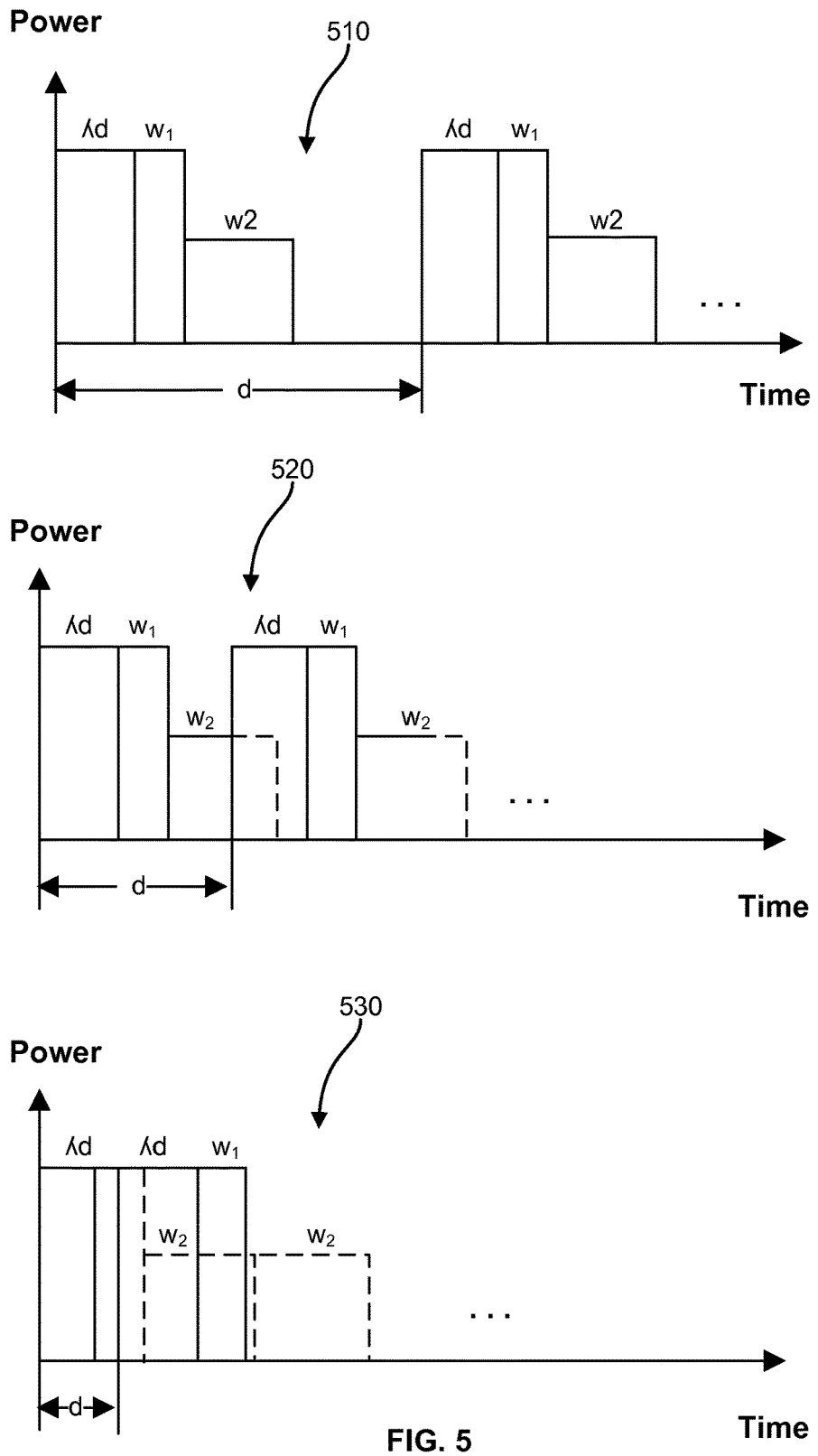
FIG. 5 illustrates example power consumptions of a client over time, according to certain embodiments of the present disclosure.
Figure 6:
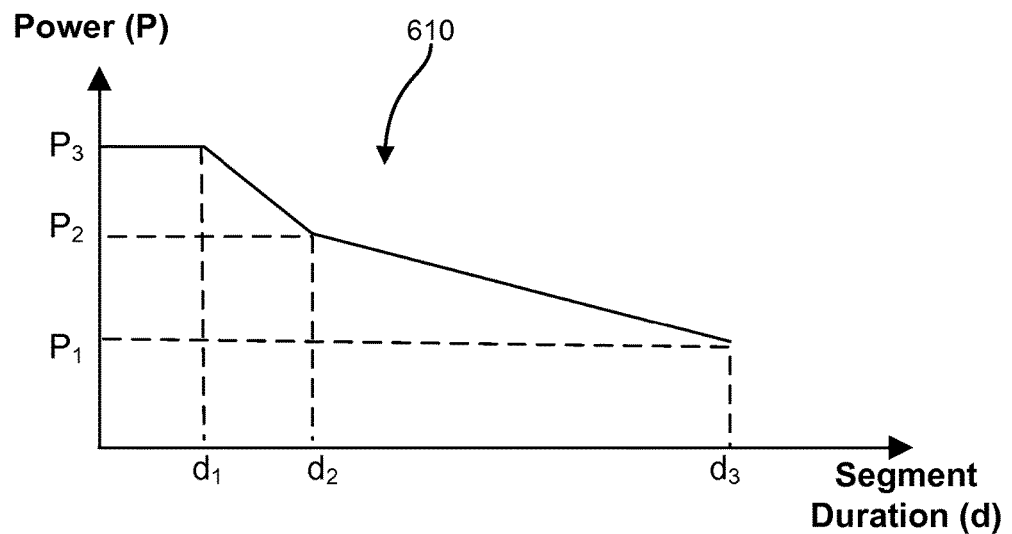
FIG. 6 illustrates example power consumptions of a client over durations of media segments and number of media segments, according to certain embodiments of the present disclosure.
Figure 6:
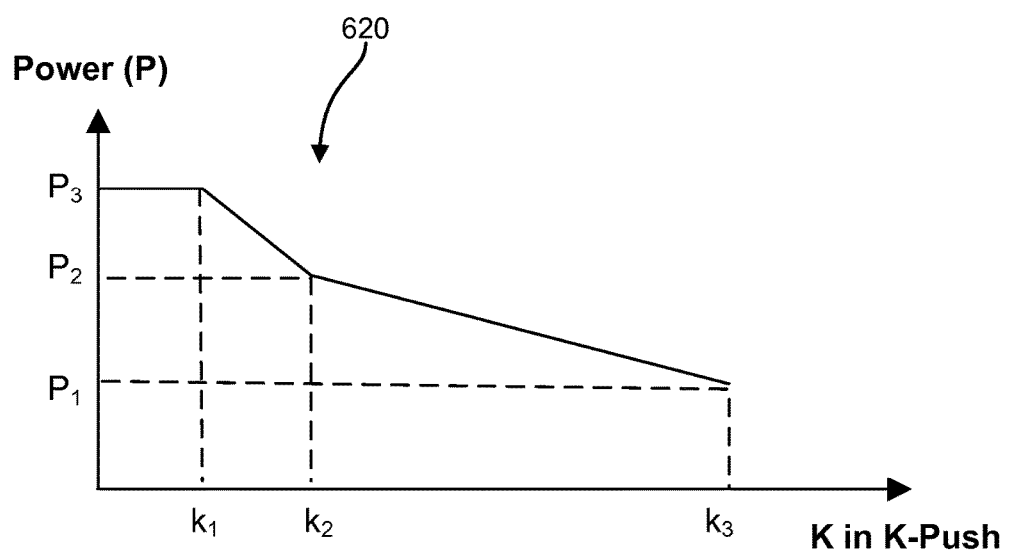

To compute the "K" value and, accordingly, optimize the power consumption given the current conditions, a combination of the different parameters is considered. Additionally or alternatively, segment durations are determined to optimize the power consumption based on the combination of the different parameters. The "K" value is used for the power aware K-push mechanism and can be used for the power aware segment duration mechanism. Similarity, segment durations are selected under the power aware segment duration mechanism and can be selected under the power aware K-push mechanism. In an example, a power consumption model is used to analyze the combination of parameters in order to derive the "K" value and the segment durations. While FIG. 5 illustrates how the different parameters are considered, FIG. 6 illustrates example power consumption models.

Advantages of the K-push strategy include saving power, which can prolong the battery life of power-constrained devices, such as smart phones, tablets, laptops, and the like.

To illustrate, assume that the client 110, can download a two second video segment in one second. In this case, the client 110 could download three video segments (of six seconds total content) in three seconds. While using traditional HTTP streaming, the client would send a request out every two seconds, as video segments are played back, so as to retain a buffer of video segments in the cache 116. In contrast, in accordance with implementations of the present disclosure, one request could be sent out for all three video segments. Thus, the client 110 transmits fewer requests and more likely enters the idle state 410, thereby saving power and battery life.

By increasing the "K" value, a smaller number of total requests are made to stream the multimedia content 122 and, thus, less power is consumed. However, a high "K" value may not be always advantageous. For example, a high "K" value may hinder adaptive streaming by limiting the client 110 from adapting the bitrate unless already received and buffered additional media segments are disposed. Thus, it is important to consider a combination of the various parameters to determine the "K" value that optimizes the power consumption given the current conditions.

Advantages of the segment duration selections also include saving power. To illustrate, assume that the server 120 stores a one minute video as two sub-streams: a first sub-stream of thirty video segments, each two second long and a second sub-stream of six video segments, each ten second long. While using traditional HTTP streaming, the client 110 would send a request out for each segment. If the first video sub-stream is selected, the client 110 would send thirty HTTP requests corresponding to the thirty video segments. On the other hand, if the second video sub-stream is selected, the client 110 would send six HTTP requests. Thus, the client 110 transmits fewer requests and more likely enters the idle state 410 (e.g., the number of timer expiry is reduced because the media segments are downloaded faster than real time) if the second video sub-stream is used, thereby saving power and battery life.

The longer the segment durations, the smaller the number of streaming requests is and, thus, less power is consumed. However, a segment duration that is too long may not be always advantageous. For example, a long segment duration may hinder adaptive streaming by limiting the client 110 from adapting the bitrate until the already received and buffered long media segment is played or disposed. Thus, it is important to consider a combination of the various parameters to determine segment duration that optimizes the power consumption given the current conditions.

Turning to FIG. 5, the figure illustrates a combination of the different parameters and the resulting power consumption. Generally, the power consumption varies with the duration of the media segments (e.g., the length of each) along with the remaining parameters. The variance stems from the client device 110 switching its power consumption between the different states 410, 420, and 430 of the state machine. FIG. 5 illustrates three scenarios of media segment durations: large segment duration 510, medium segment duration 520, and small segment duration 530. The value of the total power consumption (P) can be determined by analyzing the three scenarios based on the relationship among the different parameters including the segment duration, the bitrate, the bandwidth, and the inactivity timers.

The following notations are used in FIG. 5. "v" represents the length of a media sub-stream (e.g., a video sub-stream). "d" represents the media segment (e.g., video segment) duration. "r" represents the media bitrate. "b" represents the available bandwidth. "λ" represents the bitrate/bandwidth ratio (e.g., $\lambda = r/b$). "p" represents the power consumption per unit time. "P" represents the total power consumption. "$w_1$" represents the inactivity timer of the full power state 420 (e.g., "$w_1$" represents timer 1" 422 of FIG. 4). "$w_2$" represents the inactivity timer of the half power state 430 (e.g., "$w_2$" represents timer 2" 432 of FIG. 4).

In each of the three illustrated segment duration scenarios, the client 110 transition between the different states of the state machine and, accordingly, consumes power based on the different parameters. In the case where the segment duration "d" is larger than the download time and inactivity timers combined as shown in the large segment duration 510, "d" satisfies the following:

$$\lambda d + w_1 + w_2 < d < v \quad (1)$$

which is, $$\frac{w_1 + w_2}{1 - \lambda} < d < v. \quad (2)$$

The total power consumption "P," is given by:

$$P = \frac{v}{d}\left[p(\lambda d + w_1) + \frac{p}{2}w_2\right]. \quad (3)$$

In the case where the end of segment duration "d" ends after "$w_1$," and before "$w_2$," as shown in the medium segment duration 520, "d" satisfies the following:

$$\lambda d + w_1 < d < \lambda d + w_1 + w_2 \quad (4)$$

which is, $$\frac{w_1}{1 - \lambda} < d < \frac{w_1 + w_2}{1 - \lambda}. \quad (5)$$

At the end of duration "d," the client 110 starts the next request cycle. Thus, the half power state (e.g., "$w_2$") finishes early and escalates to the full power state. In this case, the total power consumption can be calculated as:

$$P = \frac{v}{d}\left[p(\lambda d + w_1) + \frac{p}{2}(d - \lambda d - w_1)\right]. \quad (6)$$

In the case where the duration "d" ends before the end of "$w_1$," as shown in the small segment duration 530, "d" satisfies the following:

$$\lambda d < d < \frac{w_1}{1 - \lambda} \quad (7)$$

which is, $$0 < d < \frac{w_1}{1 - \lambda}. \quad (8)$$

In this case, the client 110 remains in the full power state throughout the entire media streaming session and, therefore, $$P = pv. \quad (9)$$

By understanding how the different parameters impact the power consumption, a power consumption model is developed. The power model is used as an analytical model to calculate the total power consumption "P" during a streaming session in order to evaluate and optimize the power efficiency of multimedia streaming. The power consumption model can be further adapted for the K-push streaming strategy in order to determine the "K" value that optimizes the power consumption given the current conditions of the client 110, the server 120, and the network.

FIG. 6 illustrates two power consumption models 610 and 620. The power consumption model 610 is derived from the above equations of FIG. 5 and represents how the power consumption varies with the change in the media segment duration. This model 610 is used to select a segment duration under the power aware segment duration mechanism, as further illustrated in FIGS. 11-13. The power consumption model 620 is adapted from the power consumption model 610 to the K-push strategy by considering the "K" value as a function of the media segment duration. This model 620 is used to select a "K" value under the power aware K-push mechanism, as further illustrated in FIGS. 8-10.

By putting together the three scenarios of FIG. 5, it is noted that the bitrate/bandwidth ratio "λ" and the segment duration "d" play important roles in power consumption. The power consumption model 610 of FIG. 6 represents a plot of the total power consumption "P" with varying the segment duration "d" according to equations (1) to (9). Three values of the total power consumption "P," denoted as "$P_1$," "$P_2$," and "$P_3$," corresponding to the three segment durations "d," denotes as "$d_1$," "$d_2$," and "$d_3$," are used in the power consumption model 610. The values of the total power consumption "P" are given by:

$$P_1 = p\left(\lambda v + w_1 + \frac{w_2}{2}\right);\qquad(10)$$

$$P_2 = \frac{pv}{\lambda d + w_1 + w_2}\left[\lambda^2 d + (1+\lambda)w_1 + \left(\frac{1}{2} + w_2\right)\right];\qquad(11)$$

and $$P_3 = pv.\qquad(12)$$

The values of the three segment durations "d" are given by:

$$d_1 = \frac{w_1}{1-\lambda};\qquad(13)$$

$$d_2 = \frac{w_1 + w_2}{1-\lambda};$$

and $$d_3 = v.$$

It is observed from the power consumption model 610 that the lowest possible power consumption can be achieved by assigning the largest possible segment duration, which equals to the entire media sub-stream length "v." More precisely, the maximum power consumption savings that can be achieved by varying the segment duration "d" is the following:

$$\Delta P_{max} = P_3 - P_1 = p\left[(1-v) - w_1 - \frac{w_2}{2}\right].\qquad(14)$$

In practice, $\Delta P_{max}$ can be a large positive number, with a large enough media duration "v" and the high bandwidth provided by the network (e.g., 5 to 12 Mbps downlink speed, with peak speed approaching 50 Mbps in a 4G/LTE network). For example, even for a short five minute 1080p movie trailer streamed at 3 Mbps, with 5 Mbps 4G/LTE speed and inactivity timers of 5 and 12 seconds, respectively, the power saving can be up to 109 p, which is approximately the power consumption of streaming one third of the original video content.

Despite the promising potential power savings, the use of large segments in HTTP streaming is ineffective in practice. For example, during bitrate switching, the client 110 may have to delay the request of the next segment with new bitrate until the current large segment is played, or it may request the current segment with new bitrate immediately causing additional bandwidth consumption.

As such, the power aware segment duration mechanism selects a particular segment duration that reduces power consumption while also balancing the different parameters. In particular and to obtain power savings, the selected segment duration needs to be larger than "$d_1$." Thus, "$d_1$" represents the lower bound of determining a segment duration for low power streaming. The power consumption decreases linearly as the segment duration increases from "$d_1$" to "$d_2$." The upper bound for segment duration is "$d_3$," which is essentially the total number of segments for the video. However, in practice, there is often a tighter upper bound. For example and as explained above, the bitrate switching delay would increase linearly with the increase in the segment duration, resulting in a tradeoff between power efficiency and the ability of HTTP adaptive streaming. Thus, an acceptable segment duration lies between the range of "$d_1$" to "$d_3$," where less power consumption savings is achieved at the lower end and less adaptive streaming is achieved at the upper end.

Another approach is to use the power consumption model 620 adapted to the K-push strategy. To derive this model 620, it is observed that "K" pushed segments, each with duration "d," are equivalent to the regular HTTP request/response of a large segment with duration "K×d." Therefore, the power consumption model 610 can be used to determine the impact of the "K" value to the power consumption by adapting this model 610 based on the "K×d" duration.

In particular, the power consumption model 620 assumes that each media segment has a fixed duration "$d_p$." This assumption impacts how the server 120 stores the different sub-streams. For example, the server 120 stores media segments at fixed segment durations "$d_p$," ranging between one and ten seconds. In other words, each sub-stream in this example represents a sequence of media segments of the same fixed segment duration "$d_p$." For instance, the server 120 stores a one minute video in two video sub-streams. The first video sub-stream uses two second for the fixed segment duration "$d_p$," and, thus, is composed of thirty video segments. In comparison, the second video sub-stream uses five second for the fixed segment duration "$d_p$," and, thus, is composed of twelve video segments.

By using the fixed duration "$d_p$," the "K" value is expressed as:

$$K = \frac{d}{d_v}.\qquad(15)$$

Therefore, the power consumption model 620 with varying "K" can be plotted as illustrated in FIG. 6. In this model 620, the power consumption values "$P_1$," "$P_2$," and "$P_3$," are the same as those in equations (10) to (12). The three boundary values of the "K" value, denoted as "$k_1$," "$k_2$," and "$k_3$," are given by the following:

$$k_1 = \frac{w1}{(1-\lambda)d_p};$$ (16)

$$k_2 = \frac{w_1 + w_2}{(1-\lambda)d_p};$$

and $$k_3 = \frac{v}{d_v}.$$

To obtain power savings, the "K" value needs to be larger than "$k_1$." Thus, "$k_1$" represents the lower bound of determining a "K" value for low power streaming. The power consumption decreases linearly as the "K" value increases from "$k_1$" to "$k_2$." The upper bound for the "K" value is "$k_3$," which is essentially the total number of segments for the video. However, in practice, there is often a tighter upper bound of the "K" value determined by the constraints of bitrate switching delay and bandwidth overhead. For example, the bitrate switching delay would increase linearly with the "K" value, resulting in a tradeoff between power efficiency and the ability of HTTP adaptive streaming. Thus, an acceptable "K" value lies between the range of "$k_1$" to "$k_3$," where less power consumption savings is achieved at the lower end and less adaptive streaming is achieved at the upper end.

Based on the power consumption models, such as the power consumption model 620, a power aware K-push strategy is provided. In this strategy, the "K" value is computed based on the different parameters representative of the current conditions of the client 110, the server 120, and/or the network 130. As explained herein above, to compute the "K" value, the different boundaries are computed and the "K" value is selected between the lower and upper boundaries.

Figure 7:
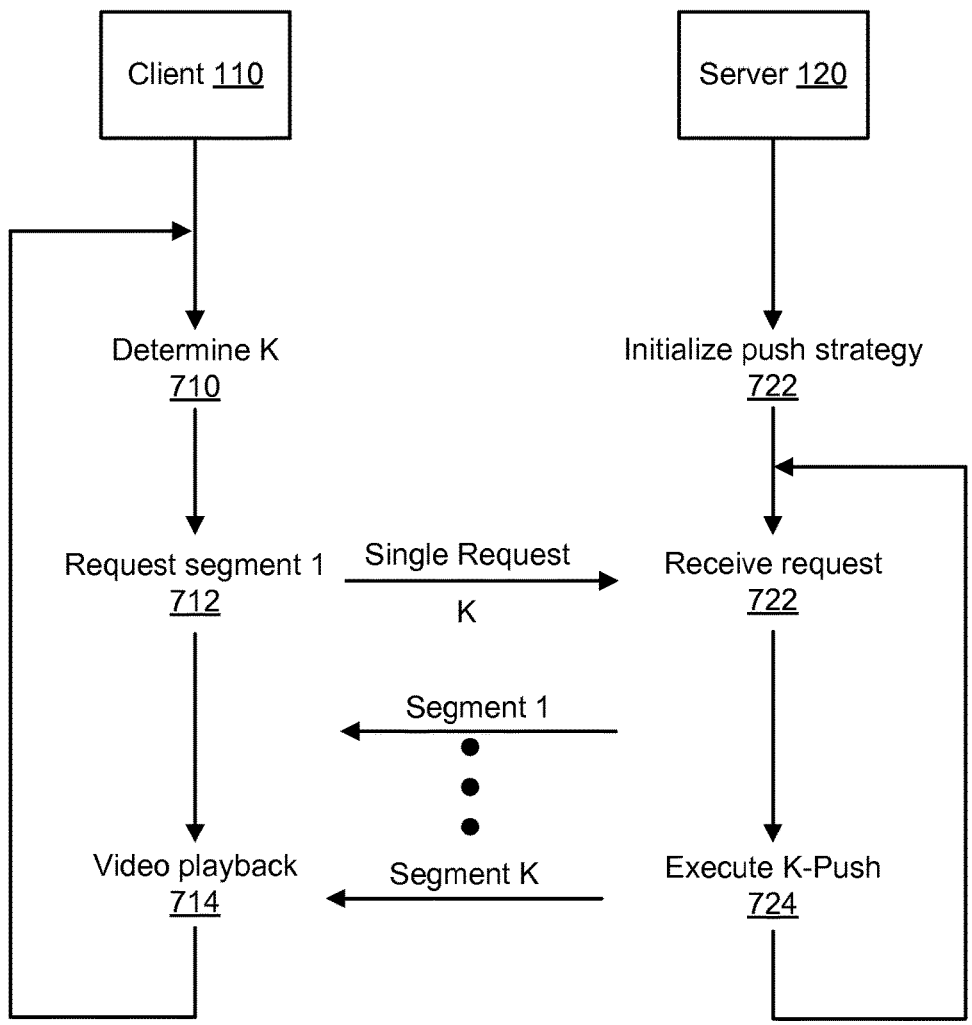
FIG. 7 illustrates an example approach for efficiently streaming multimedia content, according to certain embodiments of the present disclosure.

Turning to FIG. 7, an example of the power aware K-push mechanism is illustrated. This strategy maintains the HTTP streaming benefits of bitrate switching and scalability while also reducing the power consumption. For example, the flexibility of the bitrate switching of HTTP streaming can be achieved by adapting the "K" value to the current conditions. In other words, the "K" value need not be constant during a streaming session. Instead, the "K" value can be adaptively updated based on the latest conditions. The power consumption is reduced by reducing the number of HTTP requests to a single request per "K" received segments.

As illustrated, the end-to-end work flow of the power aware K-push mechanism includes the client 110 determining 710 the "K" value. As described herein above, the "K" value represents the number of segments that should be pushed from the server 120 in a current push cycle. This "K" value is determined by computing boundaries based on the different parameters and selecting a value falling within the boundaries. Once computed, the client signals the "K" value to the server 120 by requesting 712 a media segment (e.g., a video segment). For example, the client 110 includes the "K" value in the HTTP request for the media segment, such as an HTTP header extension in the HTTP request. In another example, the client 110 includes the "K" value in a light weight push trigger GET message separate from the HTTP request. In response to signaling the "K" value and requesting the media segment, the client 110 receives "K" media segments from the server 120 via a server push. The client 110 stores the "K" pushed media segments locally, such as in a browser or application cache. Thereafter, the client 110 need not request segments from the set of "K" segments from the server 120. Instead, the set of "K" segments is severed by the local cache without hitting the network 130 or the server 120, thereby allowing the client 110 to playback 714 the segments from the local cache.

On the server side, the server 120 initializes 722 the K-push strategy. For example, the different media substreams are pre-packaged (e.g., media segments having lengths of one or more fixed durations) and stored. Upon receiving 722 a push trigger message (e.g., the client 110 signaling of "K"), the server 120 executes 724 the K-push strategy. For example, the server 120 starts to push the indicated "K" segments over the network 130 without expecting an explicit request for each of these segments.

While FIG. 7 illustrates that the client 110 determines the "K" value, this determination may additionally or alternatively be performed by the server 120. For example, the server 120 may receive from the client 110 various parameters indicative of conditions of the client 110 (e.g., the battery power level, a desired bitrate, etc.). The server 120 then uses these parameters and other applicable parameters (e.g., segment lengths, inactivity timers, etc.) to compute the "K" value.

Experiments of the above K-push strategy have been conducted using a DASH video streaming system including an Android smart phone, Google SPDY server, a 4G/LTE cellular network, and a two minute-long 1080p movie trailer with a 2.5 Mbps bitrate and packaged into ninety DASH segments. The experiments show a power saving of twenty percent over a no-push strategy when the "K" value is selected to be equal to thirty segments. Similar experiments have also been conducted using a DASH video streaming system that includes an Android smart phone with a HTTP/2 enabled Google Chrome browser, a Jetty HTTP/2 enabled server, a 4G/LTE cellular network, and a video packaged into main profile DASH streams with various resolutions and segment durations. The experiments show a power saving of seventeen percent over a no-push strategy when the "K" value is selected to be equal to thirty segments.

Figure 8:
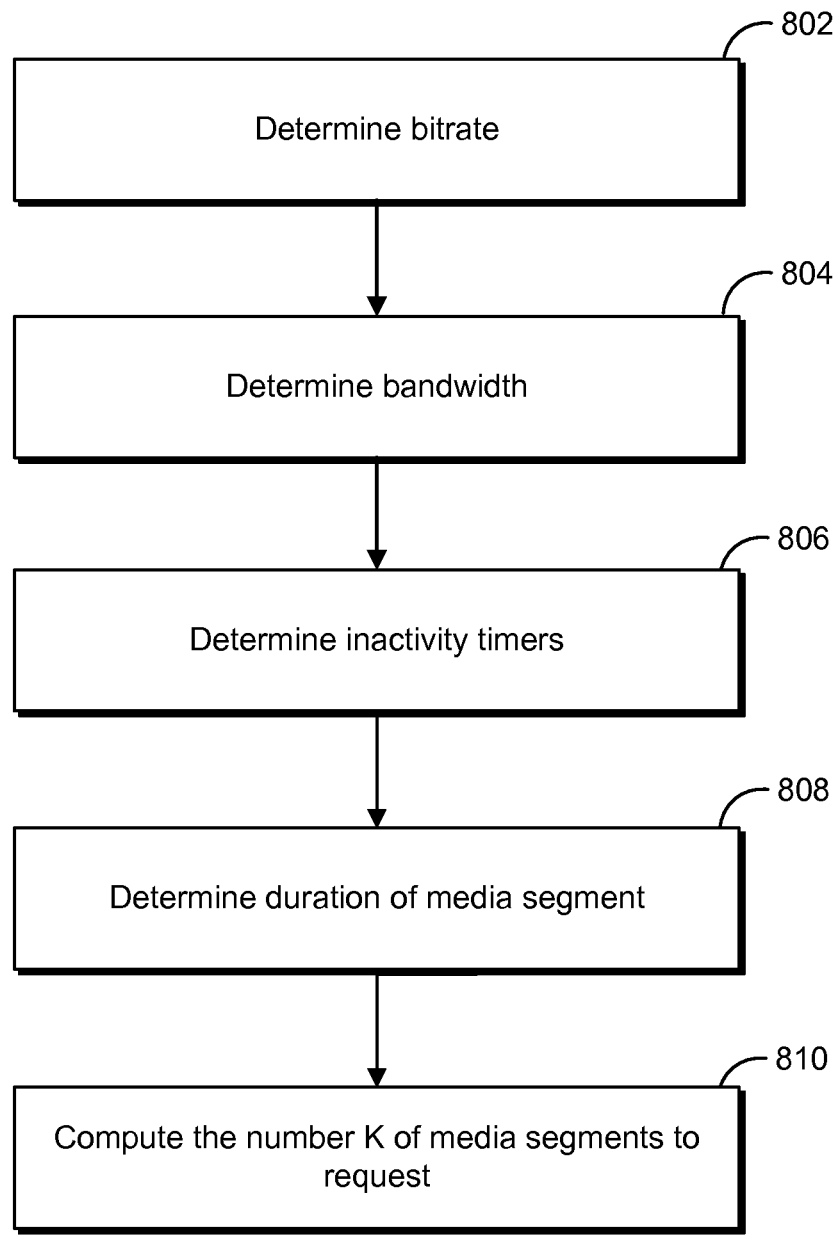
FIG. 8 illustrates a flow for determining the number of media segments to request from a server, according to certain embodiments of the present disclosure.
Figure 9:
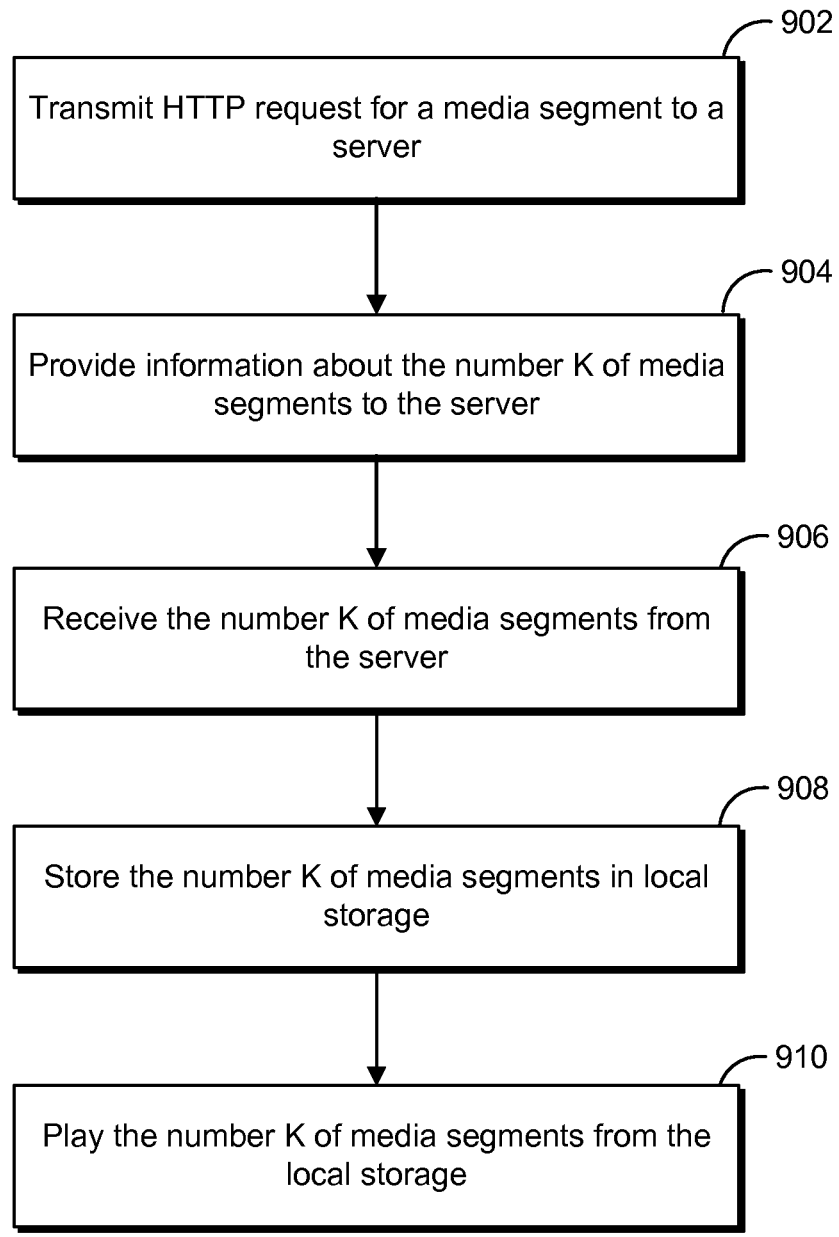
FIG. 9 illustrates an example flow for requesting the number of media segments from a server, according to certain embodiments of the present disclosure.
Figure 10:
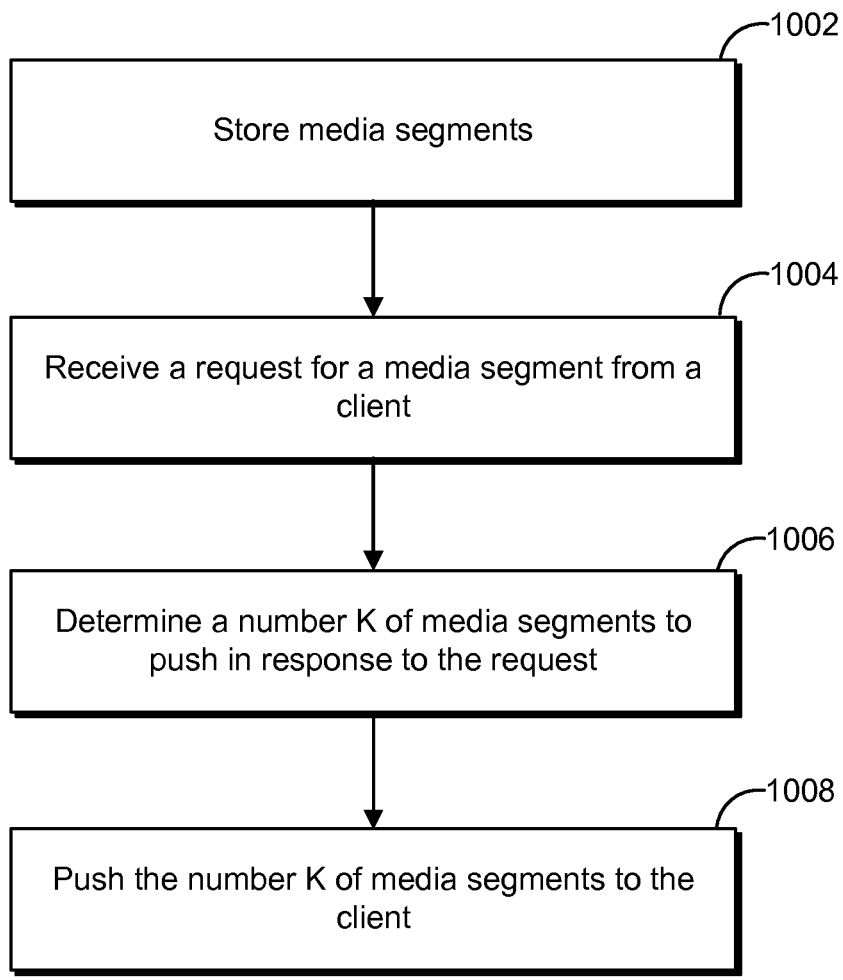
FIG. 10 illustrates an example flow for pushing the number of media segments from a server, according to certain embodiments of the present disclosure.

Turning to FIGS. 8-10, those figures illustrate example flows in connection with streaming media segments using a K-push strategy as part of the power aware K-push mechanism. In the illustrative operations, each of the operations or functions may be embodied in, and fully or partially automated by, modules executed by one or more processors of a computing system, such as one including the client 110 and/or the server 120. An example system is further illustrated in FIG. 14. Additionally, while the operations are illustrated in a particular order, it should be understood that no particular order is necessary and that one or more operations may be omitted, skipped, and/or reordered.

FIG. 8 illustrates an example flow for determining a "K" value. This flow may be implemented by the client 110, the server 120, or distributed between the client 110 and the server 120. In the interest of the clarity of explanation, the example flow of FIG. 8 is illustrated as being implemented by the client 110. However, this flow may similarly be implemented by the server 120. For example, if parameters associated with the server 120 (e.g., segment durations) are needed for the client 110 to determine the "K" value, such parameters are provided from the server 120 to the client 110. Conversely, if parameters associated with the client 110 are needed for the server 120 to determine the "K" value, such parameters are provided from the client 110 to the server 120. In comparison, FIG. 9 illustrates an example flow that the client 110 may implement to stream the multimedia content 122 from the server 120. FIG. 10 illustrates an example flow in which the server 120 pushes the "K" segments to the client 110. In the interest of explanation, a single request-push cycle is illustrated. However, multiple cycles would be repeated depending on the "K" value and the total number of media segments "N" (e.g., to stream an "N" segment video, there can be "N/K" request-push cycles).

Turning to FIG. 8, the example flow starts at operation 802 where a bitrate is determined. For example, the bitrate is selected in a media player of the client 110 to play multimedia content. Accordingly, the bitrate is determined from the selection. Generally, the higher the network bandwidth, the higher the bitrate can be.

At operation 804, the network bandwidth is determined. For example, the client 110 determined the time needed to download a media segment of a known duration. The bandwidth is then computed as a function of the known duration of the media segment to the time.

At operation 806, inactivity timers are determined. In an example, the inactivity timers are provided from the server 120 or computed based on information provided from the server 120. In another example, the client 110 computes the inactivity timers independently of information from the server 120.

The inactivity timers "$w_1$" and "$w_2$" are typically carrier dependent and are unknown to the client 110. To compute "$w_1$" and "$w_2$," the client 110 utilizes a side-channel based approach. The average load time of the file is then measured. By varying the interval incrementally and repeating the measurements, the promotion delays are captured, included in the load time, when the radio state switches from the half power state to the full power state and from the idle state to the full power state, respectively. The interval when the former switch occurs is approximately "$w_1$," while that when the latter switch occurs is approximately "$w_1+w_2$."

At operation 808, the duration of media segments is determined. The duration represents a fixed duration from available fixed durations of media sub-streams stored at the server 120. For example, the client 110 can receive indications of the fixed durations from the server 120.

At operation 810, the "K" value of media segments is computed. For example, the power consumption model 620 and the corresponding equations are used to compute lower and upper boundaries of the "K" value (e.g., the boundaries corresponding to "$k_1$" and "$k_3$," respectively). The client 110 then selects a "K" value that falls within the boundaries. In an example, the selection represents a tradeoff between power consumption and how adaptive streaming can be. Adaptive streaming impacts the user experience especially for switch down. With a lower "K" value, higher adaptive streaming and smaller power consumption savings may be achieved. Conversely, with a higher "K" value, lower adaptive streaming and larger power consumption savings may be achieved. In an example, the client 110 performs this tradeoff or balancing based on its battery power level. For example, if the battery power is below a threshold, the latter tradeoff is typically selected.

Turning to FIG. 9, the figure illustrates an example flow that the client 110 implements to stream the multimedia content 122 from the server 120. The example flow starts at operation 902, where the client 110 transmits an HTTP request that identifies a media segment of the multimedia content 122 to the server 120. At operation 904, the client 110 provides information about the "K" value to the server 120. In an example, the client 110 computes and signals the "K" value to the server in the HTTP request or in a separate HTTP message. In another example, the client 110 provides information about parameters representative of current condition of the client 110 such that the server 120 computes the "K" value.

At operation 906, the client 110 receives "K" media segments from the server 120. These media segments are received via a server push in response to the single HTTP request without necessitating additional requests from the client 110 to the server 120. At operation 908, the client stores the "K" media segments in local storage, such as the cache 116. Accordingly and at operation 910, the client 110 plays the media segments from the local storage without requesting any additional media segments of the "K" pushed media segments from the server 120.

Turning to FIG. 10, the figure illustrates an example flow that the server 120 implements to stream the multimedia content 122 to the client 110. The example flow starts at operation 1002, where the server stores media segments of the multimedia content 122. These segments can be stored at different fixed segment durations. At operation 1004, the server 120 receives a request for a media segment of the stored media segments from the client 110. For example, the request includes an HTTP request indicating the media segment.

At operation 1006, the server 120 determines a "K" value for pushing "K" media segments to the client 110 in response to the request. In an example, the "K" value is received as part of or along with the request from the client 110. In another example, the server 120 computes the "K" value given current conditions of the client 110, the server 120, and/or the network 130 similarly to what is illustrated in the example flow of FIG. 8. At operation 1008, the server 120 pushes the "K" media segments to the client 110. This push is in response to the request, is part of a K-push strategy, and need not explicit and additional requests specific to the remaining pushed media segments of the "K" pushed media segments.

Figure 11:
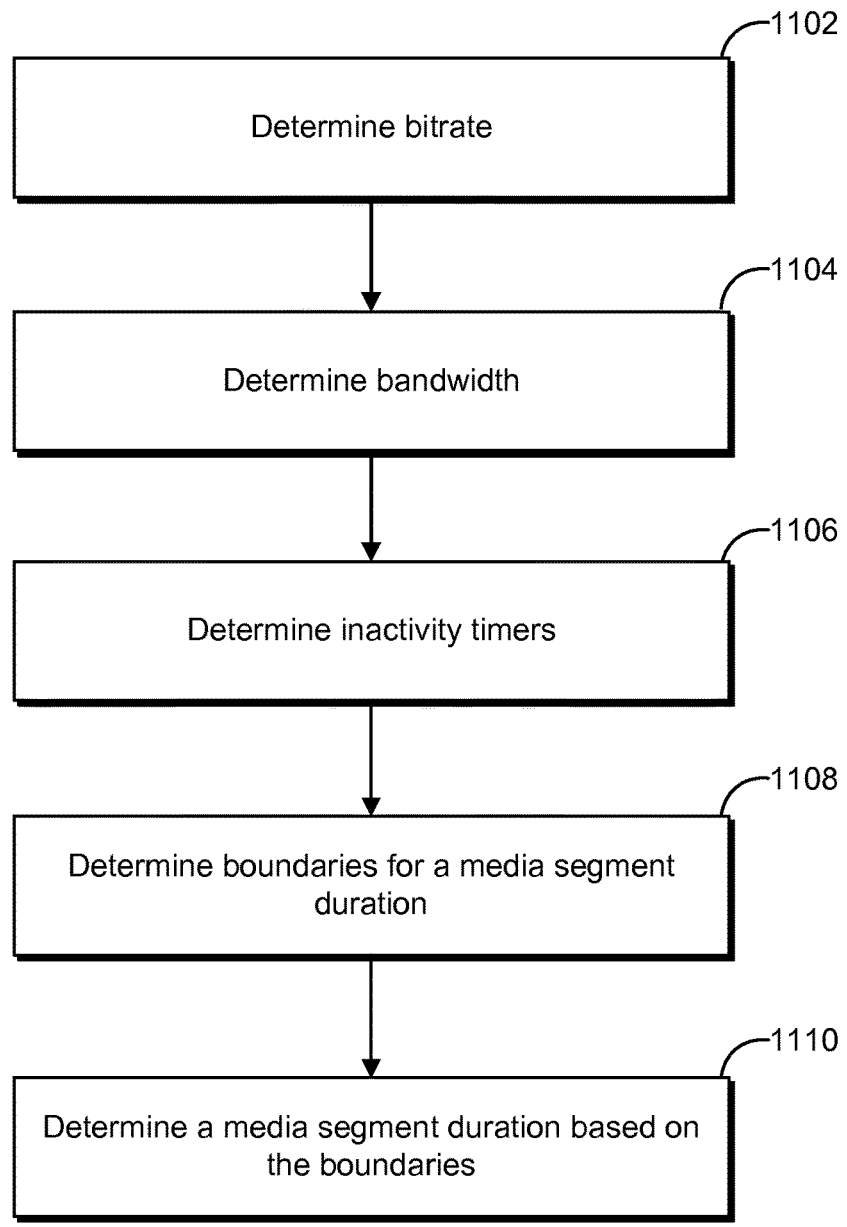
FIG. 11 illustrates a flow for determining the duration of a media segment to request from a server, according to certain embodiments of the present disclosure.
Figure 12:
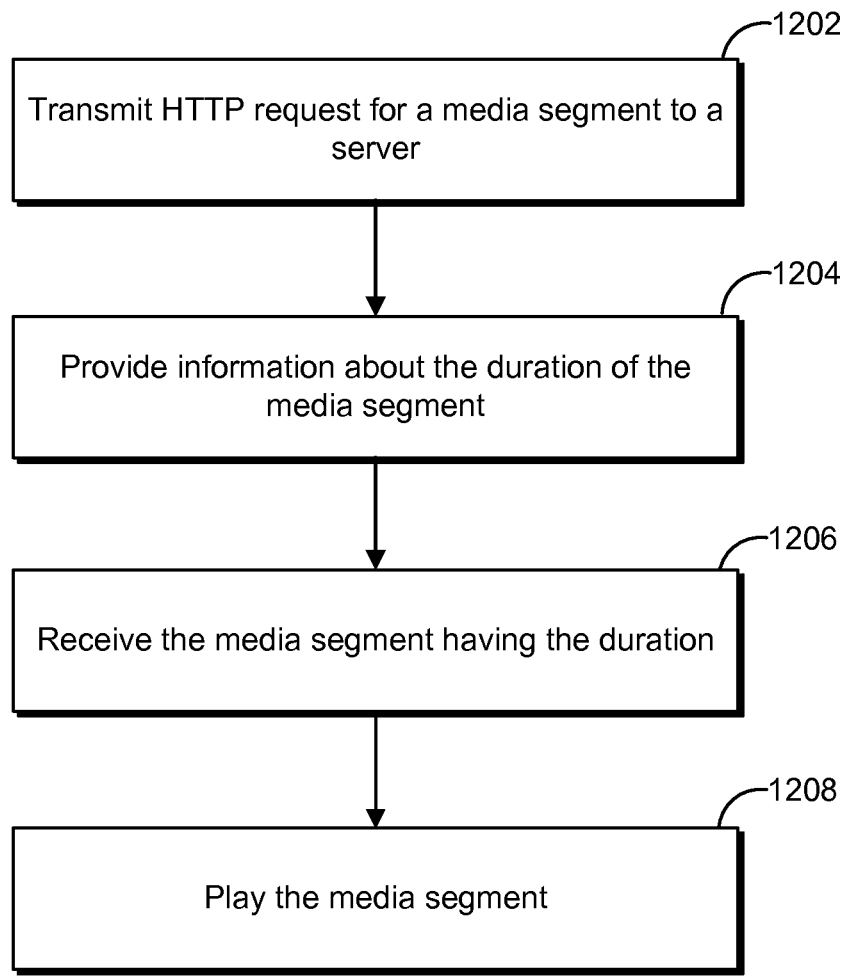
FIG. 12 illustrates an example flow for requesting a media segment of a particular duration from a server, according to certain embodiments of the present disclosure.
Figure 13:
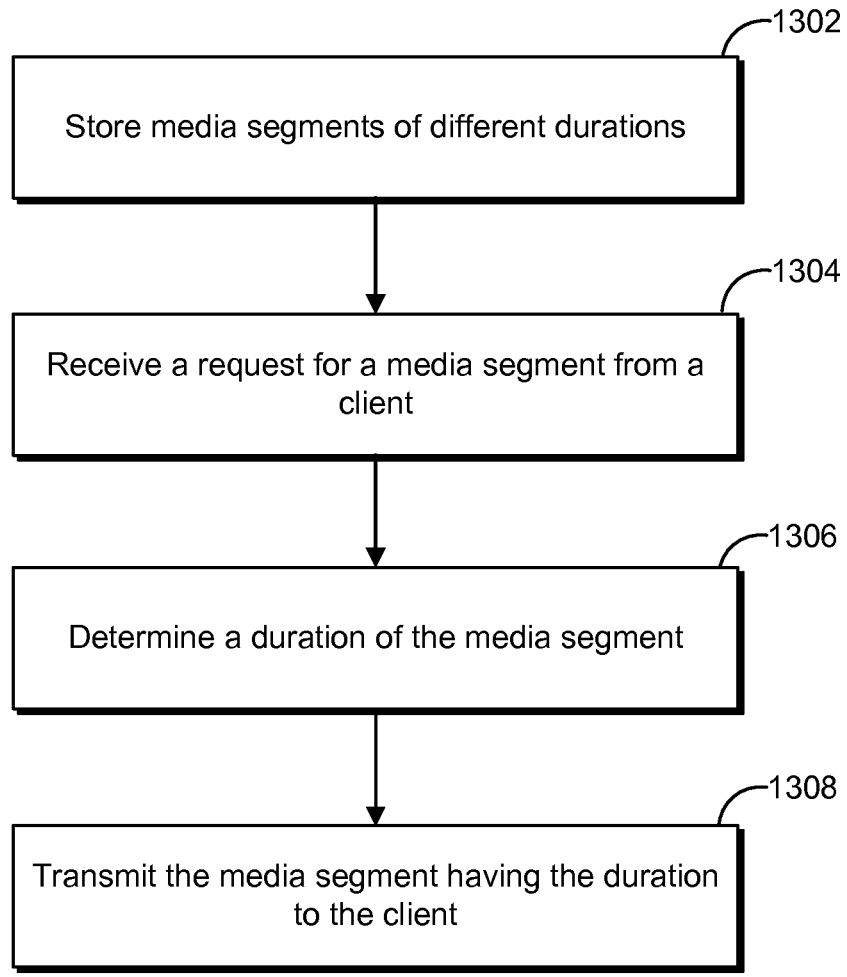
FIG. 13 illustrates an example flow for transmitting a media segment of a particular duration from a server, according to certain embodiments of the present disclosure.

Turning to FIGS. 11-13, those figures illustrate example flows in connection with streaming media segments based on selecting a media segment duration as part of the power aware segment duration mechanism. In the illustrative operations, each of the operations or functions may be embodied in, and fully or partially automated by, modules executed by one or more processors of a computing system, such as one including the client 110 and/or the server 120. An example system is further illustrated in FIG. 14. Additionally, while the operations are illustrated in a particular order, it should be understood that no particular order is necessary and that one or more operations may be omitted, skipped, and/or reordered.

FIG. 11 illustrates an example flow for determining the segment duration. This flow may be implemented by the client 110 or distributed between the client 110 and the server 120. In the interest of the clarity of explanation, the example flow of FIG. 11 is illustrated as being implemented by the client 110. However, this flow may similarly be implemented by the server 120. For example, if parameters associated with the server 120 are needed for the client 110 to determine the segment duration, such parameters are provided from the server 120 to the client 110. In particular, the server 120 can provide information about the inactivity timers or about available durations that are selectable to the client 110. Conversely, if parameters associated with the client 110 are needed for the server 120 to determine the segment duration, such parameters are provided from the client 110 to the server 120. In comparison, FIG. 12 illustrates an example flow that the client 110 may implement to stream the multimedia content 122 from the server 120. FIG. 13 illustrates an example flow in which the server 120 transmits media segments to the client 110.

Turning to FIG. 11, the example flow starts at operation 1102 where a bitrate is determined. At operation 1104, the client determines the network bandwidth. At operation 1106, the client determines the inactivity timers. Operations 1102, 1104, and 1106 are similar to operations 802, 804, and 806, respectively. The similarities are not repeated herein.

At operation 1108, boundaries for a media segment are determined. For example, the client 110 computes the boundaries based on the different parameters including the ones determined at operations 1102-1106. The power consumption model 610 and equation (13) are used and the computed "$d_1$," "$d_2$," and "$d_3$" represent the different boundaries.

At operation 1110, a particular media segment duration is determined based on the boundaries. For example, the client 110 then selects the particular media segment duration that falls within the boundaries (e.g., between "$d_1$" and "$d_3$"). This selection can also account for the available segment durations from the server. In other words, the client 110 selects a particular duration that falls within the boundaries as long as that duration is available for media segments stored at the server 120.

In an example, the selection of the segment duration represents a tradeoff between power consumption and how adaptive streaming can be. With a shorter media segment duration, higher adaptive streaming and smaller power consumption savings may be achieved. Conversely, with longer media segment duration, lower adaptive streaming and larger power consumption savings may be achieved. In an example, the client 110 performs this tradeoff or balancing based on its battery power level. For example, if the battery power is below a threshold, the latter tradeoff is typically selected.

Turning to FIG. 12, the figure illustrates an example flow that the client 110 implements to stream the multimedia content 122 from the server 120. The example flow starts at operation 1202, where the client 110 transmits an HTTP request that identifies a media segment of the multimedia content 122 to the server 120. At operation 1204, the client 110 provides information about the duration of the media segment to the server 120. In an example, the client 110 computes and signals the duration to the server in the HTTP request. In another example, the HTTP request identifies the URL media segment, where the URL is associated with the duration of the media segment. In this example, the server 120 pre-packages and stores multiple media segments for media content. One media segment can include a portion of the media content and have a particular duration. Another media segment can include that same portion and an additional portion and, thus, would have a longer duration. Each of these media segments is associated with a different URL. As such, the HTTP request of the client 110 includes the URL identifying the media segment having the proper duration. In another example, the client 110 provides information about parameters representative of current condition of the client 110 such that the server 120 determines the duration.

At operation 1206, the client 110 receives the media segment having the duration determined at operation 1204. If a K-push strategy is used, the client 110 also receives additional "K−1" pushed media segments. Each of these additional media segments would have the same duration. The received media segment(s) are stored in local storage of the client 110, such as at the cache 116. At operation 1208, the client 110 plays the received media segment(s) from the local storage.

Turning to FIG. 13, the figure illustrates an example flow that the server 120 implements to stream the multimedia content 122 to the client 110. The example flow starts at operation 1302, where the server stores media segments of the multimedia content 122. These segments are stored at different fixed segment durations. For example, a one minute video is stored as two sets of files: one set having thirty video segments, each two second long and one set having six video segments, each ten second long. At operation 1304, the server 120 receives a request for a media segment of the stored media segments from the client 110. For example, the request includes an HTTP request indicating the media segment.

At operation 1306, the server 120 determines a duration for the requested media segment. In an example, the duration is received as part of or along with the request from the client 110. For instance, the duration can correspond to a unique URL of the media segment. In another example, the server 120 selects the duration given current conditions of the client 110, the server 120, and/or the network 130 similarly to what is illustrated in the example flow of FIG. 11. At operation 1308, the server 120 transmits the media segment having the duration to the client 110. For example, the server 120 selects the media segment from available media segments according to the duration and sends the selected media segment to the client 110 in response to the HTTP request. As such, if the duration is for a three segment video segment, the server 120 selects and transmits the appropriate three second video segment rather than a two second video segment. In another example, the server 120 uses a push strategy. In response to the HTTP request, the server 120 pushes the "K" media segments to the client 110. The "K" value can be computed as illustrated in the example flow of FIG. 8 or selected using another approach (e.g., randomly, or based on a predefined value). The server 120 then pushes "K" media segments, each having the duration determined at operation 1306.

Figure 14:
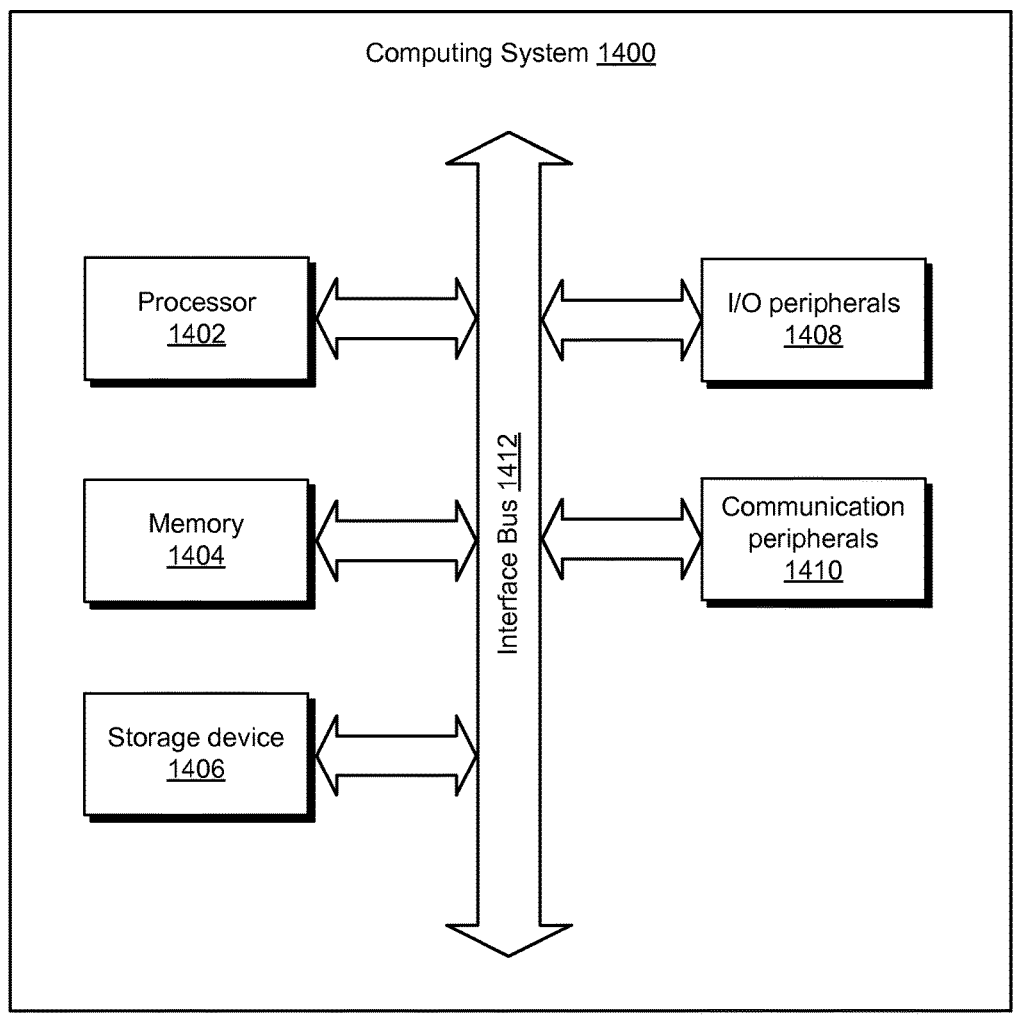
FIG. 14 illustrates an example computing environment suitable for use in implementations of the present disclosure.

Turning to FIG. 14, the figure illustrates an example computing system 1400 for implementing some or all of the components of the client 140 and/or the server 120. Although a single computing system is illustrated, this system can be distributed.

The computing system 1400 includes at least a processor 1402, a memory 1404, a storage device 1406, input/output peripherals 1408, communication peripherals 1410, and an interface bus 1412. The interface bus 1412 is configured to communicate, transmit, and transfer data, controls, and commands among the various components of the computing system 1400. The memory 1404 and the storage device 1406 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1404 and the storage device 1406 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 1400.

Further, the memory 1404 includes an operating system, programs, and applications. The processor 1402 is configured to execute the stored instructions and includes, for example, a logical processing unit, a microprocessor, a digital signal processor, and other processors. The memory 1404 and/or the processor 1402 can be virtualized and can be hosted within another computing system of, for example, a cloud network or a datacenter. The input and output peripherals 1408 includes user interfaces such as a keyboard, screen, microphone, speaker, other input/output devices, and computing components such as graphical processing units, serial ports, parallel ports, universal serial bus, and other input/output peripherals. The input/output peripherals 1408 are connected to the processor 1402 through any of the ports coupled to the interface bus 1412. The communication peripherals 1410 are configured to facilitate communication between the computing system 1400 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. In a wireless network environment, a method for influencing power consumption of a client streaming multimedia content from a server hypertext transfer protocol (HTTP) by controlling how many HTTP requests are used by the client, the method comprising:
   determining, by the client that uses a radio resource control (RRC) protocol, a number of media segments of the multimedia content to request from the server per request based on a context of one or more of: the client, the server, or the wireless network environment, wherein the number is greater than one;
   sending, by the client to the server, a single HTTP request indicating the number of media segments, wherein sending the single HTTP request is performed according to the RRC protocol; and
   receiving, by the client from the server, the number of media segments in response to the single HTTP request.

2. The method of claim 1, further comprising:
   sending, by the client to the server, an additional HTTP request indicative of (i) the number of media segments or (ii) an additional number of media segments, the additional number determined based on an updated context of the one or more of: the client, the server, or the wireless network;
   receiving, by the client from the server, the additional number of media segments in response to the additional HTTP request; and
   playing, by the client, multimedia content corresponding to one or more of (i) the number of media segments and (ii) the additional number of media segments as a media stream.

3. The method of claim 1, wherein the context includes a battery power level of the client, a bitrate of streaming the multimedia content, a network bandwidth, inactivity timers of a resource management protocol, and a duration of the media segments.

4. The method of claim 1, wherein the number is determined from a range having a lower bound computed based on a bitrate, network bandwidth, inactivity timers, and a duration of the media segments.

5. The method of claim 1, wherein the number is determined from a range having an upper bound computed based on inactivity timers and a duration of the media segments.

6. The method of claim 1, wherein determining the number comprises the client computing the number based on the context, and wherein the single HTTP request includes the number.

7. The method of claim 1, wherein determining the number comprises receiving the number from the server, and wherein the number is computed at the server based on the context.

8. The method of claim 1, wherein the wireless network environment comprises a cellular network, wherein the client comprises a mobile device, wherein the power consumption is specified by the RRC protocol of the cellular network, and wherein the single HTTP request indicating the number of media segments is used without changing the RRC protocol.

9. The method of claim 1, wherein the media segments are received in response to the server pushing the number of media segments based on the single HTTP request.

10. The method of claim 1, wherein the number of media segments is determined by an application of the client, wherein the single HTTP request indicates the number, wherein receiving the number of media segments comprises:
   storing, by the application, the number of media segments in a cache of the client in response to a push of the number of media segments from the server, wherein the push is based on the single HTTP request;
   playing, by the application, a first segment of the media segments in response to the single HTTP request;
   requesting, by the application, a second segment of the media segments from cache; and
   playing, by the application, the second segment based on receiving the second segment from cache and without submitting another HTTP request to the server.

11. A computer-readable storage medium comprising instructions for influencing power consumption in a wireless network environment of a client streaming multimedia content from a server using hypertext transfer protocol (HTTP) by affecting how many HTTP requests are used, the instructions when executed by a processor of the server, cause the server to perform operations comprising:
   receiving, from the client that uses a radio resource control (RRC) protocol, a single HTTP request indicating a number of media segments of the multimedia content, the number greater than one and based on a context of one or more of: the client, the server, or the wireless network environment, the single HTTP request sent from the client according to the RRC protocol; and
   pushing, to the client, the number of media segments in response to the single HTTP request.

12. The computer-readable storage medium of claim 11, wherein the number is received in a header extension of the single HTTP request.

13. The computer-readable storage medium of claim 11, wherein the number is received by the server in a HTTP message separate from the single HTTP request.

14. The computer-readable storage medium of claim 11, wherein the number is computed by the server based on the context of the client received with the single HTTP request.

15. The computer-readable storage medium of claim 11, wherein the single HTTP request identifies a media segment and the number, and wherein pushing the number of media segments comprises transmitting the number of media segments in response to the single HTTP request without an additional HTTP request for an additional media segment.

16. The computer-readable storage medium of claim 11, wherein the media segments comprise video segments, wherein pushing the number of media segments comprises transmitting the video segments and a number of associated audio segments in response to the single HTTP request without an additional HTTP request for a video segment of the video segments or an audio segment of the audio segments.

17. A system for influencing power consumption in a wireless network environment of a client streaming multimedia content from a server, the system comprising:
   a processor; and
   a computer-readable storage medium comprising instructions that, when executed by the processor, cause the system to:
      determine a number of media segments of the multimedia content, the number greater than one and determined based on a context of one or more of: the client, the server, or the wireless network environment; and
      cause the server to push the number of the media segments in response to a single hypertext transfer protocol (HTTP) request of the client, the single hypertext transfer protocol (HTTP) request specifying a media segment of the multimedia content and indicating the number, the single hypertext transfer protocol (HTTP) request sent from the client to the server according to a radio resource control (RRC) protocol.

18. The system of claim 17, wherein the single request comprises a single hypertext transfer protocol (HTTP) request, wherein determining the number of media segments comprises:
   computing the number based on a bitrate of streaming the multimedia content, a network bandwidth, inactivity timers of a resource management protocol, and a duration of the media segments; and
   providing the number in the single HTTP request from the client to the server.

19. The system of claim 17, wherein causing the server to push the number of the media segments comprises:
   causing the server to transmit the number of the media segments to the client in response to the single (HTTP) request without an additional request for remaining media segments of the media segments; and
   causing the client to store the number of the media segments in a cache of the client such that the remaining media segments of the multimedia content are played from the cache without an additional request to the server for the media segments.

20. The system of claim 17, wherein a stateless communication protocol is used to transmit the single (HTTP) request from the client to the server and to push the number of the media segments from the server to the client.

* * * * *